US008863820B2

(12) United States Patent
Laursen et al.

(10) Patent No.: US 8,863,820 B2
(45) Date of Patent: Oct. 21, 2014

(54) MEASUREMENT DEVICE FOR HEAT EXCHANGER AND PROCESS FOR MEASURING PERFORMANCE OF A HEAT EXCHANGER

(75) Inventors: Paul Laursen, Toronto (CA); Corry Comello, Scarborough (CA); Roderick Lee, Markham (CA)

(73) Assignee: Invodane Engineering Ltd, Toronto (CA)

( * ) Notice: Subject to any disclaimer, the term of this patent is extended or adjusted under 35 U.S.C. 154(b) by 1106 days.

(21) Appl. No.: 12/778,654

(22) Filed: May 12, 2010

(65) Prior Publication Data

US 2011/0282619 A1 Nov. 17, 2011

(51) Int. Cl.
*F22B 37/00* (2006.01)
*G01K 1/02* (2006.01)
*G01K 13/02* (2006.01)
*G01K 17/20* (2006.01)

(52) U.S. Cl.
CPC .............. *G01K 1/022* (2013.01); *G01K 13/02* (2013.01); *G01K 17/20* (2013.01); *G01K 2013/026* (2013.01)
USPC .......................... 165/11.2; 374/148; 374/165

(58) Field of Classification Search
USPC ............. 73/152.12; 165/11.1, 11.2; 374/148, 374/147, 5, 120, 141, 165; 138/41
See application file for complete search history.

(56) References Cited

U.S. PATENT DOCUMENTS

| 32,336 A | 5/1861 | Luce | |
|---|---|---|---|
| 1,795,348 A * | 3/1931 | Schmidt | 165/95 |
| 3,086,167 A | 4/1963 | Chaney et al. | |
| 3,224,247 A * | 12/1965 | Barrett, Jr. | 73/1.18 |
| 3,266,077 A * | 8/1966 | Elliott et al. | 15/104.062 |
| 3,779,270 A * | 12/1973 | Davis | 137/268 |
| 4,044,611 A * | 8/1977 | Kaname et al. | 73/170.34 |
| 4,351,079 A * | 9/1982 | Fitzpatrick | 15/104.062 |
| 4,390,058 A * | 6/1983 | Otake et al. | 165/11.1 |
| 4,435,872 A * | 3/1984 | Leikam | 15/104.062 |
| 4,556,102 A * | 12/1985 | Bochinski et al. | 165/95 |
| 4,560,437 A | 12/1985 | Kleppe et al. | |
| 4,566,533 A * | 1/1986 | Bochinski et al. | 165/95 |
| 4,709,719 A * | 12/1987 | Littleton et al. | 137/268 |

(Continued)

OTHER PUBLICATIONS

Canadian Patent Application No. 2709750 Claiming Priority to U.S. Appl. No. 12/778,654, Canadian Office Action Dated Dec. 15, 2011, Measurement Device for Heat Exchanger and Process for Measuring Performance of a Heat Exchanger, 2 Pages.

*Primary Examiner* — Marc Norman
*Assistant Examiner* — Devon Russell
(74) *Attorney, Agent, or Firm* — Woodling, Krost and Rust

(57) ABSTRACT

A temperature measurement device in combination with a furnace heat exchanger is disclosed and claimed. An instrumented heat tracer sensor is launched into the heat exchanger which records the temperature of the fluid and performance at data points along the length of the heat exchanger. If a spike in the temperature as measured and recorded, since the speed of the heat tracer sensor is known, the location of the temperature increase is known which infers a burn through in the furnace. A three way valve includes a retrieve port, a chamber port, and a launch port. A small sensor control pump and a large heat exchanger flow pump propel the heat tracer sensor through the system. A plastic chamber retains the heat tracer sensor for interrogation and downloading information when the sensor is not in use in the heat exchanger. A control station communicates with the heat tracer sensor and extracts the stored temperature data therefrom.

22 Claims, 15 Drawing Sheets

(56) References Cited

U.S. PATENT DOCUMENTS

| | | | |
|---|---|---|---|
| 4,844,076 A * | 7/1989 | Lesho et al. | 600/302 |
| 4,953,986 A * | 9/1990 | Olson et al. | 374/136 |
| 5,209,112 A * | 5/1993 | McCoy et al. | 73/170.01 |
| 5,209,238 A * | 5/1993 | Sundhar | 600/551 |
| 5,433,236 A * | 7/1995 | Zollinger et al. | 137/1 |
| 5,473,787 A * | 12/1995 | Echols | 15/104.061 |
| 5,553,677 A | 9/1996 | Hinz | |
| 5,592,990 A * | 1/1997 | Ben-Dosa | 165/95 |
| 5,630,471 A * | 5/1997 | Taprogge | 165/95 |
| 5,882,428 A * | 3/1999 | Gawne | 134/8 |
| 6,241,028 B1 | 6/2001 | Bijleveld et al. | |
| 6,352,361 B1 * | 3/2002 | Nimberger et al. | 374/142 |
| 6,391,121 B1 * | 5/2002 | Sivacoe | 134/8 |
| 6,409,843 B1 * | 6/2002 | Ellett | 134/8 |
| 6,569,255 B2 * | 5/2003 | Sivacoe | 134/8 |
| 7,897,115 B2 * | 3/2011 | Adams | 422/132 |
| 7,975,758 B2 * | 7/2011 | Ho | 165/95 |
| 8,360,976 B2 * | 1/2013 | Imran | 600/309 |
| 8,449,452 B2 * | 5/2013 | Iddan et al. | 600/109 |
| 2003/0083590 A1 * | 5/2003 | Hochman et al. | 600/549 |
| 2009/0090492 A1 * | 4/2009 | Ablitzer et al. | 165/138 |
| 2011/0224942 A1 * | 9/2011 | Kidwell | 702/136 |

\* cited by examiner

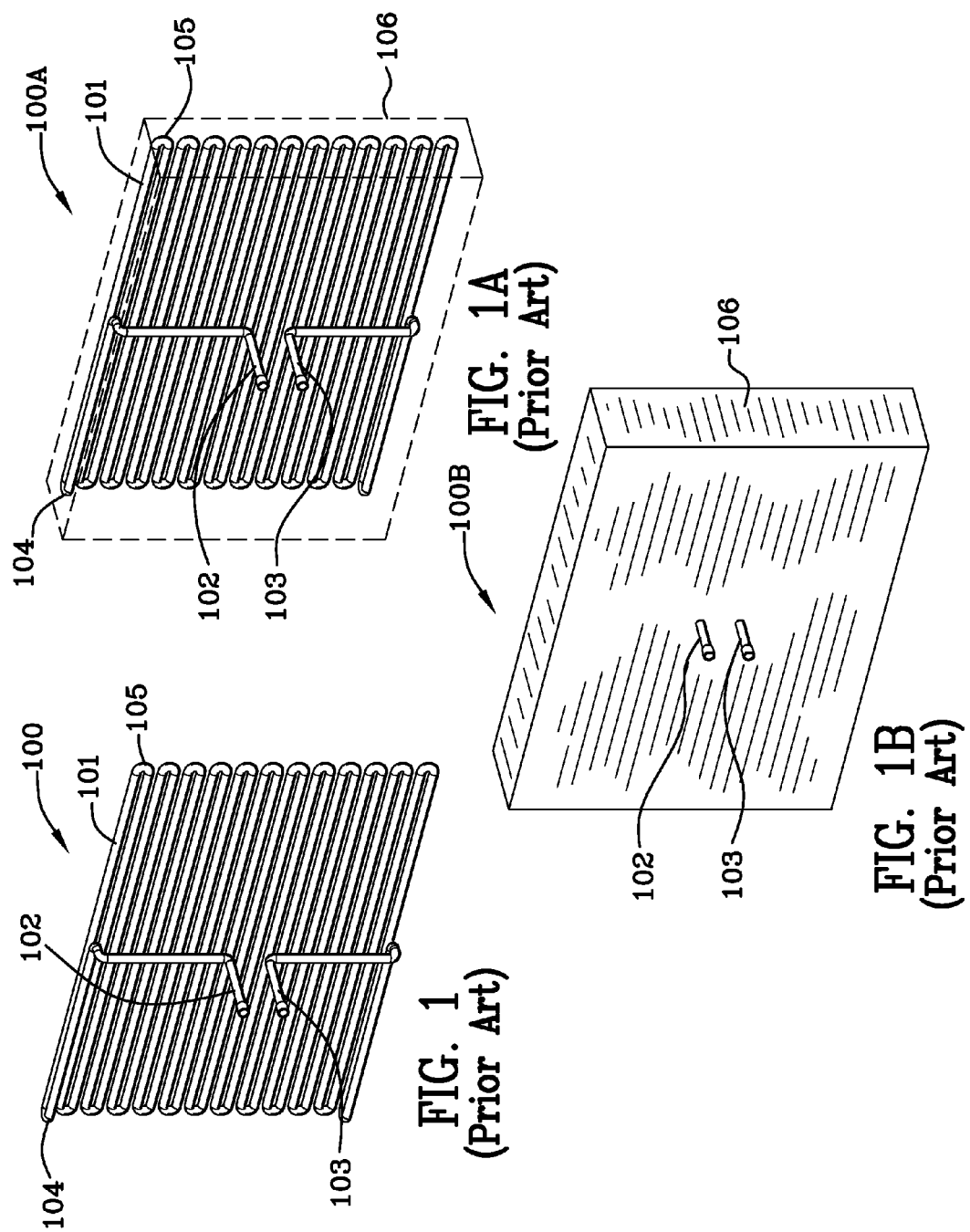

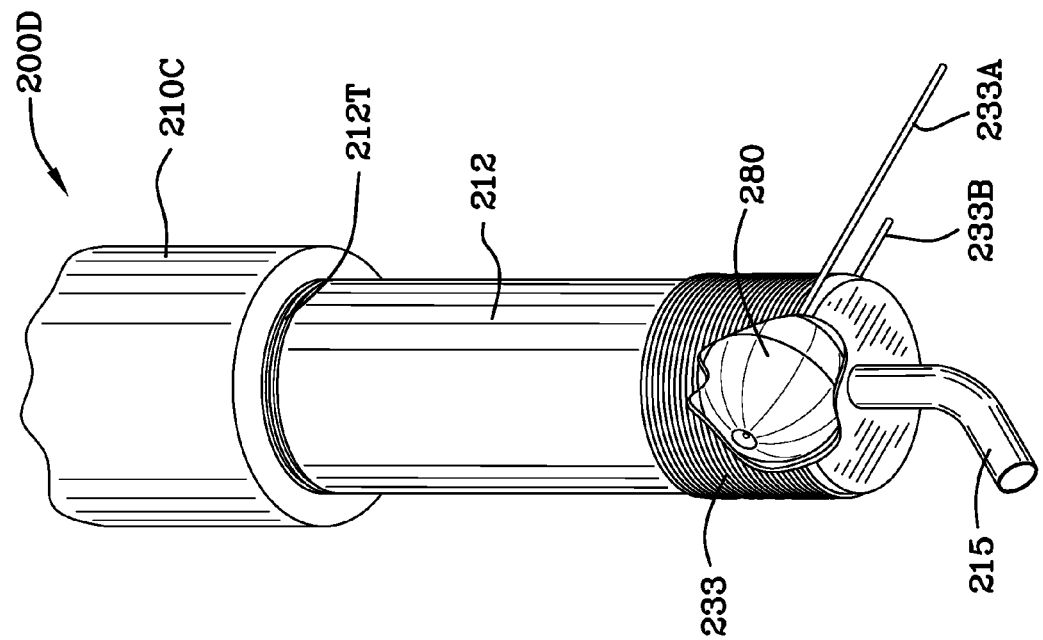
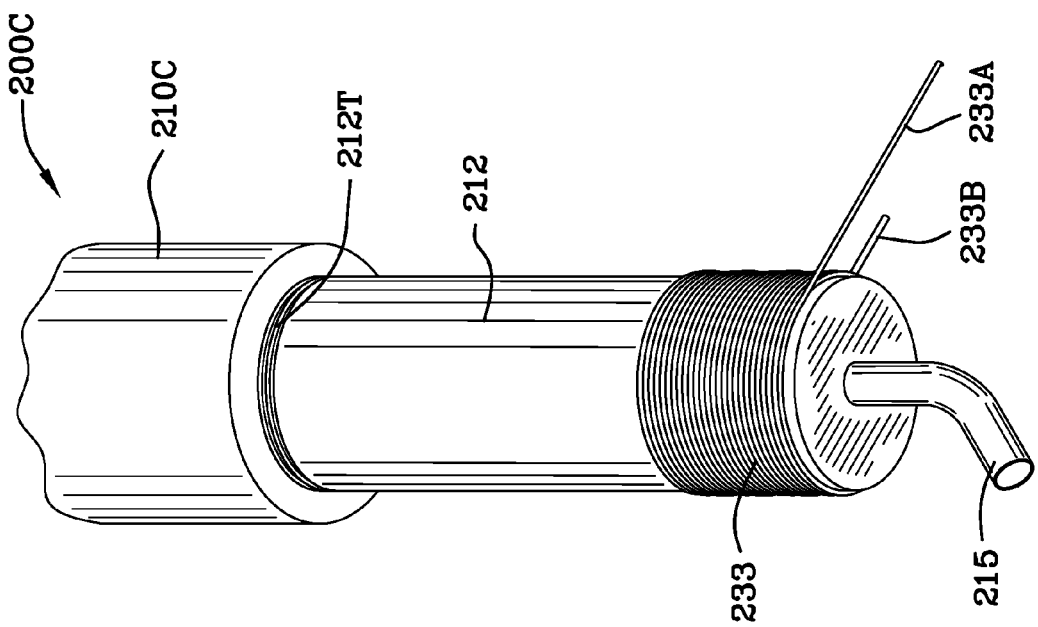

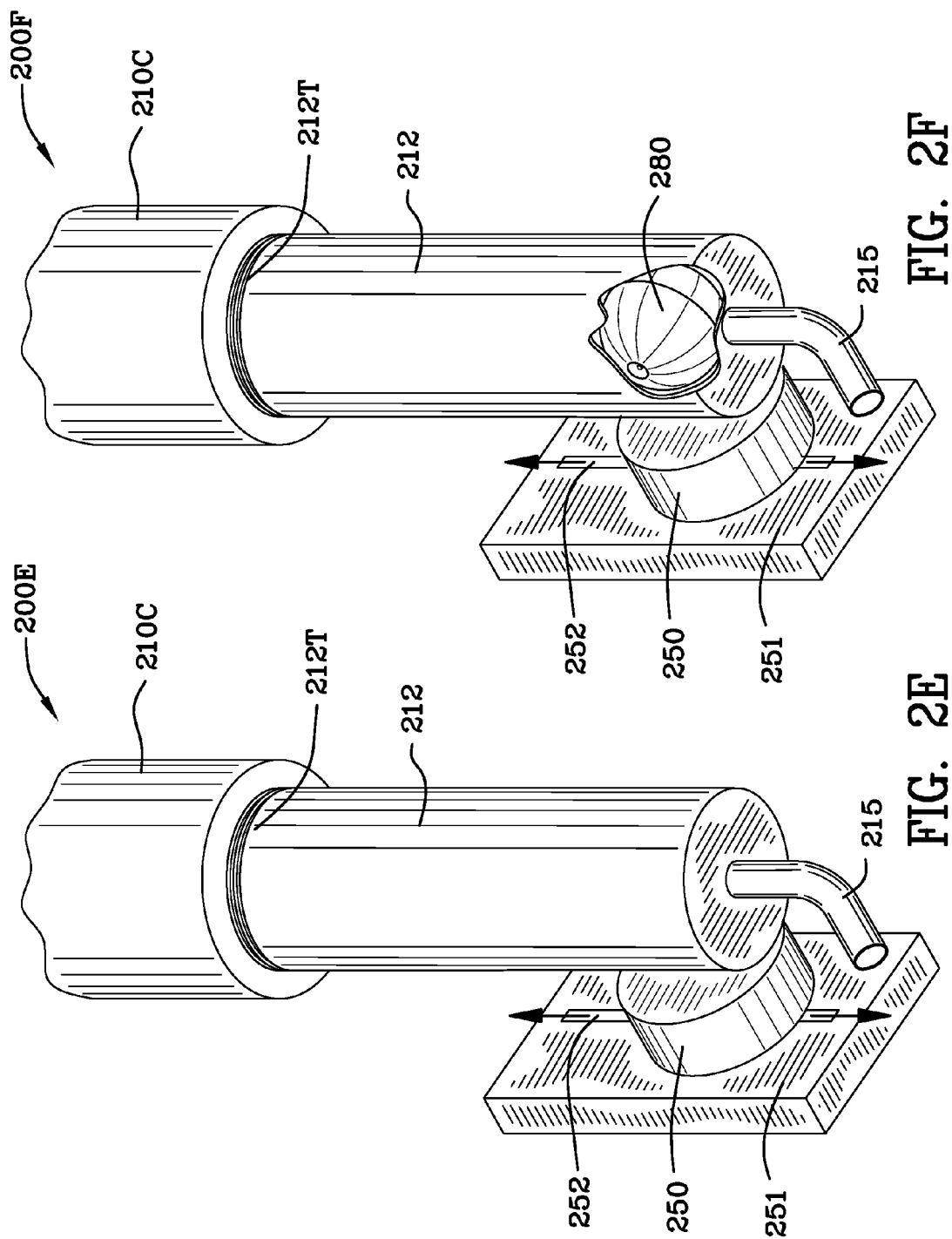

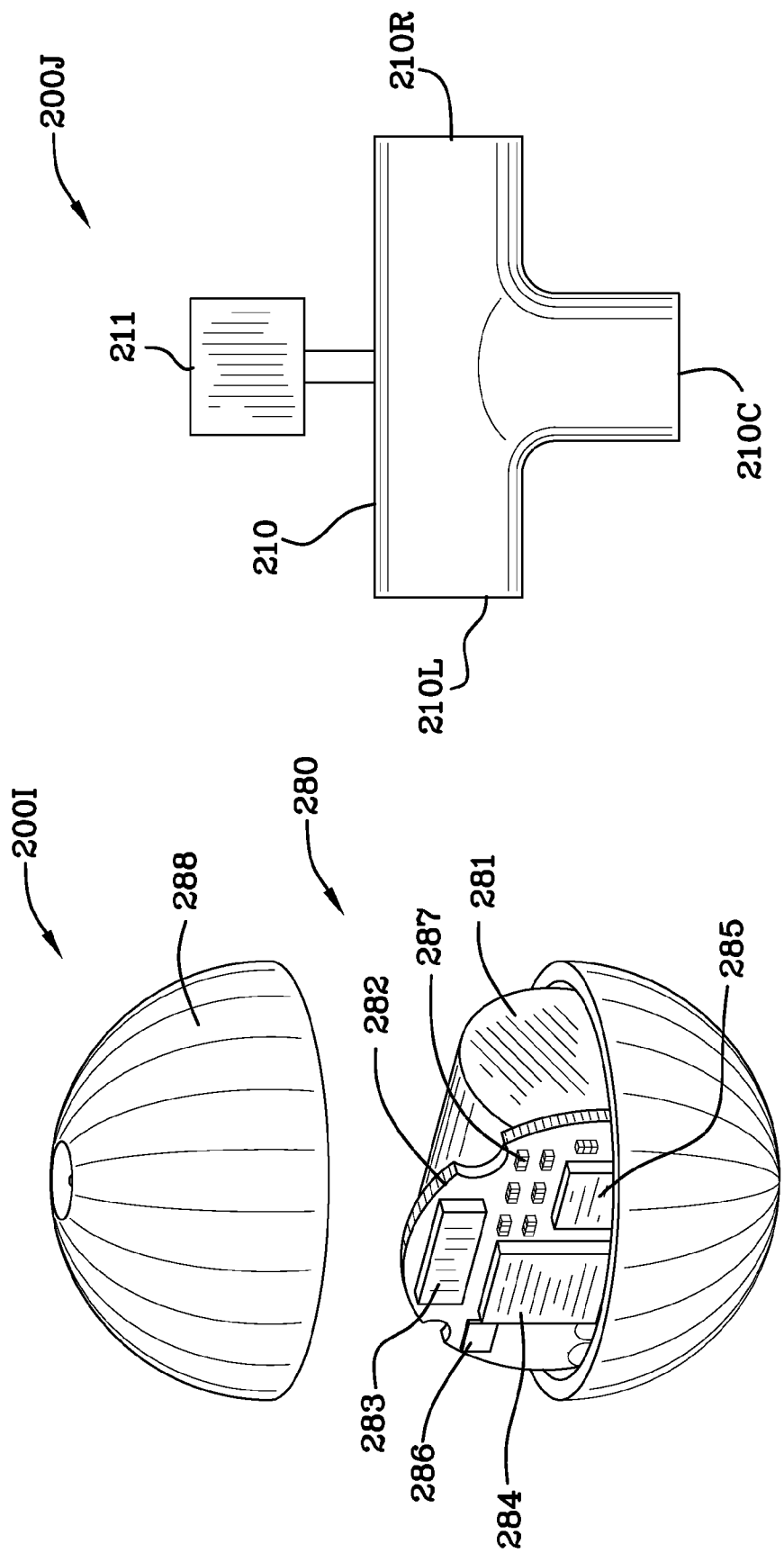

500
MEASUREMENT DEVICE FOR HEAT EXCHANGER AND PROCESS FOR MEASURING PERFORMANCE OF A HEAT EXCHANGER

FIELD OF THE INVENTION

The invention is in the field of heat exchanger temperature measurement devices and processes for use in measuring furnace and the like heat exchanger performance to determine information about the underlying process and the cooling system.

BACKGROUND

Miners worldwide have been smelting non-ferrous metal ores in various types of smelters for many years. The capital investment in these smelter furnaces is high and the technology behind these smelters is relatively mature. Smelter furnaces are shut down periodically for scheduled maintenance halting throughput of precious metals. While effort has always been made to minimize the number of down days during scheduled maintenance and to extend the intervals between maintenance, due to unprecedented global demand, there is strong incentive to minimize down time and meet production targets.

A common cause that requires repair and shut down of the smelter furnace is damage to the interior sidewall of the furnace. The molten bath in a range of 1200-1600° C. exerts an aggressive thermal load on the sidewall and its corrosive properties cause further erosion and damage to the sidewall. The industry has long been lining the walls of furnaces with refractory and copper coolers for protection as illustrated in FIGS. 1, 1A, 1B, and 1C. The coolers maintain an isotherm of frozen slag preventing further erosion of the refractory thereby preserving the structural integrity of the furnace.

FIG. 1 is a schematic 100 of one example (one arrangement) of cooling conduits which may reside in a copper cooler. FIG. 1 is an example of a heat exchanger wherein coolant conduits are arranged as shown. Reference numeral 102 indicates an inlet conduit leading to a u-shaped joint 104. U-shaped joint 104 interconnects with intermediate conduit 101 which in turn leads to and is interconnected with U-shaped joint 105. Reference numeral 103 indicates an outlet conduit which is interconnected with the intermediate conduit. Generally, as used herein the U-shaped joints/end connections 104, 105 are included within the definition of the intermediate conduit. The intermediate conduit includes all of the horizontal conduits and U-shaped joints.

FIG. 1A is a schematic 100A of a cooling conduit illustrated in phantom inside a copper cooler 106. Coolant is forced through the cooling conduits within the copper cooler absorbing heat from the process. Copper has a high thermal conductivity which conducts heat to the cooling conduits where the heat is transferred to the coolant which is then dumped to a reservoir/heat sink (not shown).

FIG. 1B is a schematic 100B of a copper cooler 106. FIG. 1C is a schematic 100C of another copper cooler illustrating multiple cooling ports 107, 108, 109, 110, 111, 112, 113, and 114 into and out of the cooler. The ports indicate multiple cooling loops/paths through the copper cooler.

As the condition of the molten metal bath changes, the molten bath may erode the refractory and eventually burn through the sidewall. Under these conditions, not only does the furnace need to be shut down for repair, the molten metal at a temperature of 1200-1600° C. could seriously injure crews working around the furnaces and impact the surrounding environment. Furthermore, damage to the expensive copper coolers is likely if contacted with the molten bath, introducing safety concerns due to a possible explosion. Overall, serious safety, environmental, and economic consequences can result from a compromised sidewall. Operators of these furnaces have longed for a non-destructive method for monitoring and determining the condition of the refractory inside the furnaces. Currently, with the exception of thermography and some ultrasound techniques, there are no known technologies which are effective to prevent the aforementioned deficiencies.

SUMMARY OF THE INVENTION

The ability to accurately monitor and determine the condition of the side wall of a furnace has many benefits. Critical information about process conditions in the furnace allows early detection and corrective actions to be taken before significant damage occurs to any specific part of the furnace walls. This extends the life and up time of the furnace allowing continuous throughput of molten metal. Better insight into the furnace condition allows operators to extend the cycle on which these furnaces are rebuilt, which is currently based predominately on experience. Knowledge of furnace performance improves the safety of the crews working around the furnaces through early detection of potential catastrophic failures. Heat flux is derived as a function of temperature measured at a specific location. The amount of heat flux exerted on the wall is an indicator of the process. This information is valuable to the operator. Heat flux can be calculated from the difference in temperature between two points and geometric information about those two points.

A temperature measurement device in combination with a furnace heat exchanger is disclosed and claimed. An instrumented heat tracer sensor is launched into the heat exchanger which records the temperature of the fluid and performance of the heat exchanger as a function of position in the heat exchanger. The position of the heat tracer sensor/thermal ball within the heat exchanger is determined by the time spent in the heat exchanger. Since the speed of the heat tracer sensor within the heat exchanger is known, the heat tracer sensor clocks the data received from thermistors mounted thereon as a function of time thus yielding the position of any temperature spike. The thermistors used have a fast response time. As the heat tracer sensor/thermal ball travels along with the coolant water through the conduits of the heat exchanger, the water traveling through the conduit convectively and quickly gains heat from the conduit. Fast response thermistors sense the increase in temperature and record it in the on-board memory of the heat tracer sensor. Temperature data is taken in intervals (as desired) as the thermal ball proceeds through the conduits of the heat exchanger. There can be any number of data points (temperature measurements) taken as the operator desires as the thermal ball proceeds through the conduits. To determine a change in temperature of the water as it flows through the conduits, a plurality of temperature measurements are taken and then the temperature measurements are selectively compared. If a spike in the temperature is measured and recorded relative to another temperature measurement or a plurality of temperature measurements in the conduits, since the speed of the heat tracer sensor/thermal ball through the conduits is known, the location of the temperature increase is known which infers a burn through point (location) in the furnace.

As stated above, the temperature data may be collected at several locations (data points) as the thermal ball passes through the conduits. This temperature data for a given test or passage through the conduits of the heat exchanger may be sent to a control station and a computer for storage and later analysis. Subsequent tests or passages through the conduits of the heat exchanger may also be sent to the control station and a computer for storage and later analysis. For instance, the heat exchanger for a given furnace may be tested at a frequency of one week and the results of each of the tests may be compared to each other. The temperature data from each of the locations along the conduits may be compared from one test run to the next subsequent test run. As stated previously, the temperature data may be compared for a single test run, for example, different locations and their respective temperatures may be compared.

A three way valve is used in the device and includes a retrieve port, a chamber port, and a launch port. A small sensor control pump propels the heat tracer sensor through the launching and retrieving components of the system and a large heat exchanger flow pump propels the heat tracer sensor through the heat exchanger.

A plastic chamber retains the heat tracer sensor for interrogation and downloading information when the sensor is not in use in the heat exchanger. A control station wirelessly communicates with the heat tracer sensor and extracts the stored temperature data therefrom. The heat tracer sensor is alternatively identified as a thermal ball. The heat tracer sensor stores temperature and time information.

The heat exchanger includes an inlet conduit, an outlet conduit, and an intermediate conduit interconnecting the inlet and outlet conduits. The measurement device includes a heat tracer sensor having an on-board battery and components affixed to a printed circuit board. The printed circuit board includes a micro-controller, a clock, fast response thermistors for sensing the temperature of the cooling fluid and the walls of the cooling conduits, a battery, a radio frequency transceiver/antenna, a memory device and a hall effect switch mounted thereon.

The hall effect switch senses the presence (or the lack of a presence) of a magnet field in proximity to the switch to change states of the switch (i.e., to activate the switch) when the heat tracer sensor is in the chamber. In other words, the hall effect switch (when activated) provides a digital output to the micro-controller which permits the application of operational battery power to the micro-controller and other devices of the heat tracer sensor. In its sleep state the micro-controller still draws a small amount of power from the battery to enable necessary functions. For example, a small amount of power must be applied to the micro-controller, clock, radio frequency transceiver/antenna, the memory device and the hall effect switch in the sleep mode so as to activate the heat tracer sensor when desired.

The magnetic field to activate (power up to operational power level)/deactivate (power down to sleep mode to conserve energy) the heat tracer sensor is generated by a coil wound around a chamber having an alternating current or a direct current applied thereto. The heat tracer sensor resides in the chamber when at rest (communicating data) and/or when it is being awakened (activated) or put to sleep (deactivated). The heat tracer sensor also resides in the chamber when it is being interrogated for the purpose of downloading data taken during passage through the conduits. Alternatively, a permanent magnet may be moved into proximity of the hall effect switch to change the state of the switch and activates/deactivates the heat tracer sensor. Still alternatively, the heat tracer sensor may be activated by use of the radio frequency transceiver whereby a radio frequency signal is used to switchably apply operational power from the battery to the components (micro-controller, radio frequency transceiver, hall effect switch and memory device) of the heat tracer sensor. Similarly, the heat tracer sensor may be deactivated by the radio frequency transceiver whereby power supplied to the on-board components of the sensor is reduced.

The chamber port of the three-way valve is connected to the plastic chamber. Fluid is forced through the inlet conduit, the intermediate conduit and the outlet conduit of the heat exchanger by the main coolant pump. The main pump pushing coolant through the conduits of the heat exchanger generally operates in the 10-20 psig range. Other pressure ranges may be employed. As fluid is forced through the inlet conduit, the intermediate conduit and the outlet conduit it gains heat from the furnace, the copper cooler and the conduits. Although the invention is being explained in regard to an example of use in connection with a furnace, those skilled in the art will readily recognize that other examples and other processes may employ the invention as set forth herein.

The launch port of the three-way valve is interconnected with the inlet conduit of the heat exchanger and the retrieve port of the three-way valve is interconnected with the outlet conduit of the heat exchanger. The interconnections between the three way valve and the inlet/outlet conduits may be a hose which is usable in high temperature environments. Alternatively, the interconnections may be metallic or plastic tubing or piping which is usable in high temperature environments. The heat tracer sensor travels through the inlet conduit, the intermediate conduit and the outlet conduit of the heat exchanger measuring and storing the temperature of the fluid as a function of time of flight (and, hence, position) within the heat exchanger and measurement device. The heat tracer sensor is selectively isolated in the plastic chamber when measurements are not required and when the heat tracer sensor is being interrogated and data is being downloaded to the control station. The control station communicates with the heat tracer sensor and extracts stored temperature data therefrom when desired. Otherwise, the heat tracer sensor may be stored in the plastic chamber while in the sleep mode.

The three way valve is used in conjunction with the small heat transfer sensor pump. There are four possible configurations of the three way valve. The three way valve includes a chamber port interconnected with the plastic chamber, a launch port interconnected with a first Y strainer in the inlet conduit of the heat exchanger, and a retrieve port interconnected with a second Y strainer in the outlet conduit of the heat exchanger. In the first configuration the chamber port and the launch port are connected and a passageway forms therein (within the three way valve) for passage of the heat tracer sensor/thermal ball. In the second configuration the chamber port and the retrieve port are connected and a passageway forms therein for passage of the heat tracer sensor/thermal ball. In the third configuration the retrieve port and the launch port are connected and a passageway forms therein for passage of the heat tracer sensor/thermal ball. In each of the first three configurations the passageways between the recited ports are exclusive and no other passageways exist. In other words the passageways formed in each configuration are the only passageways. In the fourth configuration no ports are connected and no passageways exist.

Preferably the three way valve includes an actuator positioning the three way valve in one of four positions, namely, the retrieve port communicating with the chamber port, the launch port communicating with the chamber port, the retrieve port communicating with the launch port, and, closed. In the closed position flow is prohibited between the ports of the three way valve and it is not possible to move water or the heat tracer sensor through the three way valve.

A small heat tracer sensor reversible pump operable in a first direction and a second direction is used to launch and retrieve the heat tracer sensor, respectively. Sometimes as used herein the small heat tracer sensor reversible pump may just be referred to as the reversible pump. The heat tracer sensor initially resides in the plastic chamber and is placed therein when the system is initially assembled.

The control station controls operation of the reversible sensor pump in first and second directions. In the first direction of operation the sensor pump pushes the heat tracer sensor out of the plastic chamber in and through the three way valve and in and through a first Y strainer into the inlet conduit of the heat exchanger.

The reversible pump is interconnected with the inlet conduit of the heat exchanger upstream of the first Y strainer in the inlet conduit. When operating the sensor pump in the first direction, water is extracted upstream from the first Y strainer in the inlet conduit of the heat exchanger and the water is forced along with the heat tracer sensor in a first direction into and through the plastic chamber, the chamber port of the three way valve, the launch port of the three way valve, the first Y strainer and into the inlet conduit whereby the heat tracer sensor continues into and traverses the intermediate conduit gathering temperature data. Pressure in the hose/pipe/conduit interconnecting the three way valve and the first inlet Y strainer connection is slightly higher than the water source pressure thus enabling the injection of the water (and heat tracer sensor) into the first inlet Y strainer connection and hence the inlet conduit of the heat exchanger.

As stated before, the reversible sensor pump is interconnected with the plastic chamber and when operated in the second direction, extracts water and the heat tracer sensor from the outlet conduit of the heat exchanger through the second Y strainer, into and through the retrieve port of the three way valve, in and through the plastic chamber port of the three way valve, and into the plastic chamber whereby the heat tracer sensor is deposited therein. When the reversible pump operates in the second direction it forces water in the second direction into and through the inlet conduit upstream of the first Y strainer of the heat exchanger.

When desired, the control station controls the three-way valve and selectively positions the three way valve allowing communication between the chamber port of the three way valve and the launch port of the three way valve to permit launch of the heat tracer sensor from the plastic chamber into the inlet conduit of the heat exchanger with the reversible pump operating in the first direction pushing the heat tracer sensor out of the chamber.

When desired, the control station selectively positions the three way valve allowing communication between the retrieve port of the three way valve and the chamber port of the three way valve to permit extraction of the heat tracer from the outlet conduit of the heat exchanger with the reversible pump operating in the second direction.

The control station employs a radio frequency transmitter/antenna to communicate with the heat tracer sensor (which also employs a radio frequency transmitter/antenna) when the heat tracer sensor resides in the plastic chamber so as to download temperature data measured and stored by the heat tracer sensor as it traversed the heat exchanger. The data is communicated from the control station to a remotely located computer.

The heat tracer sensor includes a battery, a thermistor, a radio frequency transceiver/antenna, a micro-controller, and a memory device. The antenna is a flat antenna and consumes a very small area within the heat tracer sensor. The heat tracer sensor includes a hall effect switch, and, as indicated above it controls the application of operational battery power to the thermistor, the radio frequency transceiver/antenna, the micro-controller, and the memory device. As stated previously, when the thermal ball/heat tracer sensor is deactivated (in the sleep mode), the thermal ball/heat tracer sensor still draws some power (low power) from the battery so that it may be activated out of the sleep mode. The micro-controller, radio frequency transceiver, hall effect switch and memory device have sleep modes (low power consumption modes) enabling the conservation of battery power when the thermal ball/heat transfer sensory are not being used in the conduit and are not communicating data back and forth between the control station. The battery supplies low power to the heat tracer sensor/thermal ball when it is in the sleep mode (low power consumption mode) and the battery supplies operational power to the heat tracer sensor/thermal ball when it is in the operation mode (relatively higher power consumption mode). The operational power mode and the sleep power mode (low power mode) are controlled by the hall effect switch or the radio frequency transceiver mounted on the printed circuit board. When the heat tracer sensor is in the plastic chamber, it can be activated (supplied with operational power) or deactivated (supplied with reduced/low power mode).

An inlet, or first, Y strainer is interposed in the inlet conduit of the heat exchanger and the launch port of the three-way valve is interconnected with the inlet Y strainer. An outlet, or second, Y strainer is interposed in the outlet conduit of the heat exchanger and the retrieve port of the three-way valve is interconnected with the outlet, or second, Y strainer. The first Y strainer guides the heat tracer sensor into the inlet conduit of the heat exchanger and the second Y strainer guides the heat tracer sensor out of the outlet conduit of the heat exchanger. The strainers include screens which prohibit the heat tracer sensor from entering the coolant reservoir and/or the main pump. In other words, the strainers guide the heat tracer sensor into and out of the heat exchanger. The main pump feeds coolant water into and through the inlet conduit of the heat exchanger and thereafter the coolant water continues through the intermediate conduit of the heat exchanger, and thereafter the coolant water exits the outlet conduit of the heat exchanger. The first Y strainer is in the inlet conduit of the heat exchanger and the flow of water in the inlet conduit 202 educts water from a hose or pipe which interconnects the launch port of the three way valve and the first Y strainer. The second Y strainer is in the outlet conduit of the heat exchanger and there is a hose or pipe which interconnects the retrieve port of the three way valve and the second Y strainer.

The three-way valve may be positioned such that the retrieve port communicates with the launch port and then the heat tracer sensor passes through the heat exchanger multiple times. In this mode of operation, which may be called the multiple pass mode, the heat tracer sensor is moved circuitously through the first Y strainer, the inlet conduit, the intermediate conduit, the outlet conduit, the second Y strainer and back to and through three way valve where the circuit begins. This process may continue as desired until such time that it is interrupted by the operator by repositioning the three way valve for communication between the retrieve port and the chamber port and employing the small heat tracer sensor launch pump in the second direction which tends to lower the pressure in the plastic chamber (which is then the suction side of the launch pump).

A process for measuring the performance of a heat exchanger is also disclosed and includes the steps of positioning a heat tracer sensor in a chamber and activating the heat tracer sensor applying on-board operational battery power to components of the heat tracer sensor. The step of positioning the heat tracer sensor in the plastic chamber is performed during assembly of the device. The chamber includes a threaded end portion which is threaded into the chamber port of the three way valve. The chamber is preferably plastic so as to facilitate passage of the magnetic field and radio frequency waves therethrough for activating/deactivating the heat tracer sensor and for communicating with the heat tracer sensor. Other materials which permit passage of magnetic field and radio frequency waves therethrough are acceptable for use as the material of construction of the chamber.

The process for measuring the performance of a heat exchanger includes positioning a three-way valve creating a passageway for the heat tracer sensor between a chamber port of the three way valve and a launch port of the three way valve. As stated previously, the launch port of the three way valve is in fluidic communication with a first Y connection in the inlet conduit of the heat exchanger. The process further includes launching, using the small reversible pump interconnected with the chamber and the inlet conduit of the heat exchanger operated in a first flow direction, the heat tracer sensor from the chamber into and through the three way valve and into and through the first Y strainer connection and into the inlet conduit of the heat exchanger. Further, the process includes forcing, using a coolant pump, the heat tracer sensor through the inlet conduit of the heat exchanger, the intermediate conduit of the heat exchanger, and the outlet conduit of the heat exchanger. The three-way valve is then repositioned creating a passageway for the heat tracer sensor between a retrieve port of the three way valve and the chamber port of the three way valve. The retrieve port of the three way valve is in fluidic communication with a second Y strainer connection in the outlet conduit of the heat exchanger.

The process further includes retrieving, using the small reversible pump interconnected with the chamber and the inlet conduit of the heat exchanger operated in a second flow direction, the heat tracer sensor from the outlet conduit into and through the second Y strainer connection in the outlet conduit and into and through the three way valve and into the chamber. The process further includes interrogating and downloading, using a control station, data and information from the heat tracer sensor residing in the chamber. The sensor is then deactivated and on-board battery power supplied to the components mounted on the printed circuit board is substantially reduced. In the reduced power consumption mode, small amounts of power are still used in the on-board electronic components so that they may be subsequently reactivated and perform their normal functions.

When the heat tracer sensor is in the chamber, data collected from the heat tracer sensor is downloaded to the control station to determine the performance of the heat exchanger. A computer remotely communicates with the control station and analyzes downloaded information to determine the performance of the heat exchanger. Data from a test run through the heat exchanger is analyzed by comparing data from different points in the same run or by comparing data from different runs to monitor the performance of the heat exchanger over a period of time.

Performance of the heat exchanger is used to infer the performance of the furnace and, in particular, to determine if the side wall has been compromised. As used herein the term side wall includes refractory materials, copper coolers and the slag buildup.

As stated above in connection with the measurement device, the process for measuring the performance of the heat exchanger includes using a first Y connection having a strainer and a second Y connection having a strainer wherein the strainers ensure that the heat tracer sensor remains in the heat exchanger monitoring loop.

It is an object of the invention to accurately monitor and determine the condition of the side wall of the furnace.

It is an object of the invention to enable early detection of potential furnace damage.

It is an object of the invention to enable corrective actions to be taken in regard to the operation of a furnace before damage and catastrophic failures occur.

It is an object of the invention to provide a measurement device for accurately determining furnace performance.

It is an object of the invention to remotely monitor the performance of a furnace.

It is an object of the invention to use an in situ heat tracer sensor within a heat exchanger to determine the performance of the heat exchanger and the furnace.

It is an object of the invention to launch and retrieve a heat tracer sensor into a furnace heat exchanger to measure the performance of the furnace.

It is an object of the invention to use a heat tracer sensor to traverse multiple furnace heat exchangers and to gather data from each of the heat exchangers.

It is an object of the invention to traverse a furnace heat exchanger multiple times and to continuously gather data each time the heat exchanger is traversed.

It is an object of the invention to employ a heat tracer sensor, a small heat tracer sensor pump, a heat tracer sensor chamber with means for actuating the heat tracer sensor, a three way valve, first and second Y strainers, for launching, retrieving and actuating the heat tracer sensor in a heat exchanger.

It is an object of the invention to employ a heat tracer sensor which includes an on-board battery, a printed circuit board, a micro-controller, a hall effect switch, a memory device, and an on-board radio frequency transceiver/antenna.

It is an object of the invention to employ a heat tracer sensor which includes a micro-controller, a hall effect switch, a memory device and an on-board radio frequency transceiver which are powered down so as to consume very little power while deactivated in the sleep mode.

It is an object of the invention to employ a control station which includes a micro-controller and on-board radio frequency transceiver/antenna which communicates with the in-board on-board radio frequency transceiver/antenna and on-board micro-controller of the heat tracer sensor.

It is an object of the invention to employ a heat tracer sensor which is activated and deactivated by a coil wrapped around a plastic chamber wherein the coil is energized by a direct current or by an alternating current.

It is an object of the invention to employ a heat tracer sensor which is activated and deactivated by a radio frequency transceiver/antenna.

These and other objects will be best understood when reference is made to the Brief Description of the Drawings and Description of the invention which follow hereinbelow.

BRIEF DESCRIPTION OF THE DRAWINGS

FIG. 1 is a schematic of one example (arrangement) of cooling conduits which reside in a copper cooler.

FIG. 1A is a schematic of a cooling conduits illustrated in phantom inside a copper cooler.

FIG. 1B is a schematic of a copper cooler.

FIG. 2C is an enlargement of the plastic chamber with the coil wrapped therearound.

FIG. 2D is an enlargement of the plastic chamber with the coil wrapped therearound with a portion of the plastic chamber cut-away illustrating a thermal ball therein.

FIG. 2E is an enlargement of the plastic chamber with the DC magnet in proximity thereto.

FIG. 2F is an enlargement of the plastic chamber with the DC magnet in proximity thereto with a portion of the plastic chamber cut-away illustrating a thermal ball (heat tracer sensor) therein.

FIG. 2I is a heat tracer sensor/thermal ball exploded assembly.

FIG. 2J is a schematic of the three way valve illustrating a receiving port, a chamber port and a launch port.

Figure 1C:
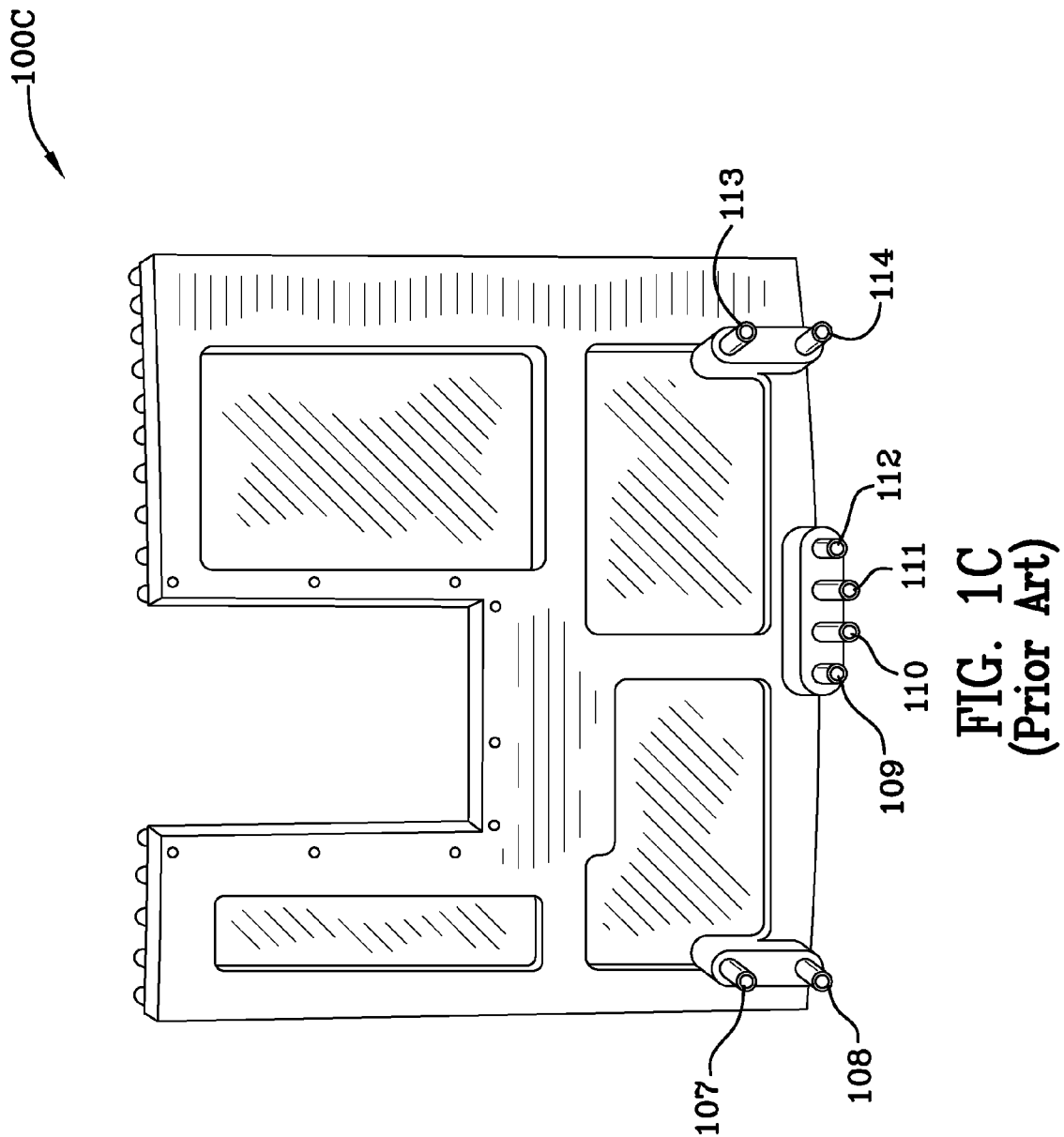
FIG. 1C is a schematic of a copper cooler illustrating multiple cooling ports into and out of a cooler.

The drawings will be better understood when reference is made to the description of the invention and the claims which follow hereinbelow.

DESCRIPTION OF THE INVENTION

The term "heat exchanger" as used herein includes a copper cooler having conduits therethrough. A "heat exchanger" as used herein also includes any device having tubes, conduits, or similar means therethough which has as its purpose a temperature control feature.

In the example given herein, the temperature of copper coolers 220, 221, 222 is being controlled. An inlet conduit 202, an intermediate conduit 270, and an outlet conduit 203 are embedded in a copper cooler/block 221. See FIG. 2A and FIG. 4. Coolant 330, in this case water, is pumped through an inlet conduit 218 and through a first Y strainer 204 and into the inlet conduit 202. The coolant water then proceeds through an intermediate conduit of known geometry, length and position with respect to the copper cooler/block 221. Coolant exits the copper cooler in outlet conduit 203 where it is directed through the second Y strainer 205 to the reservoir 330A via conduit 217.

Figure 2:
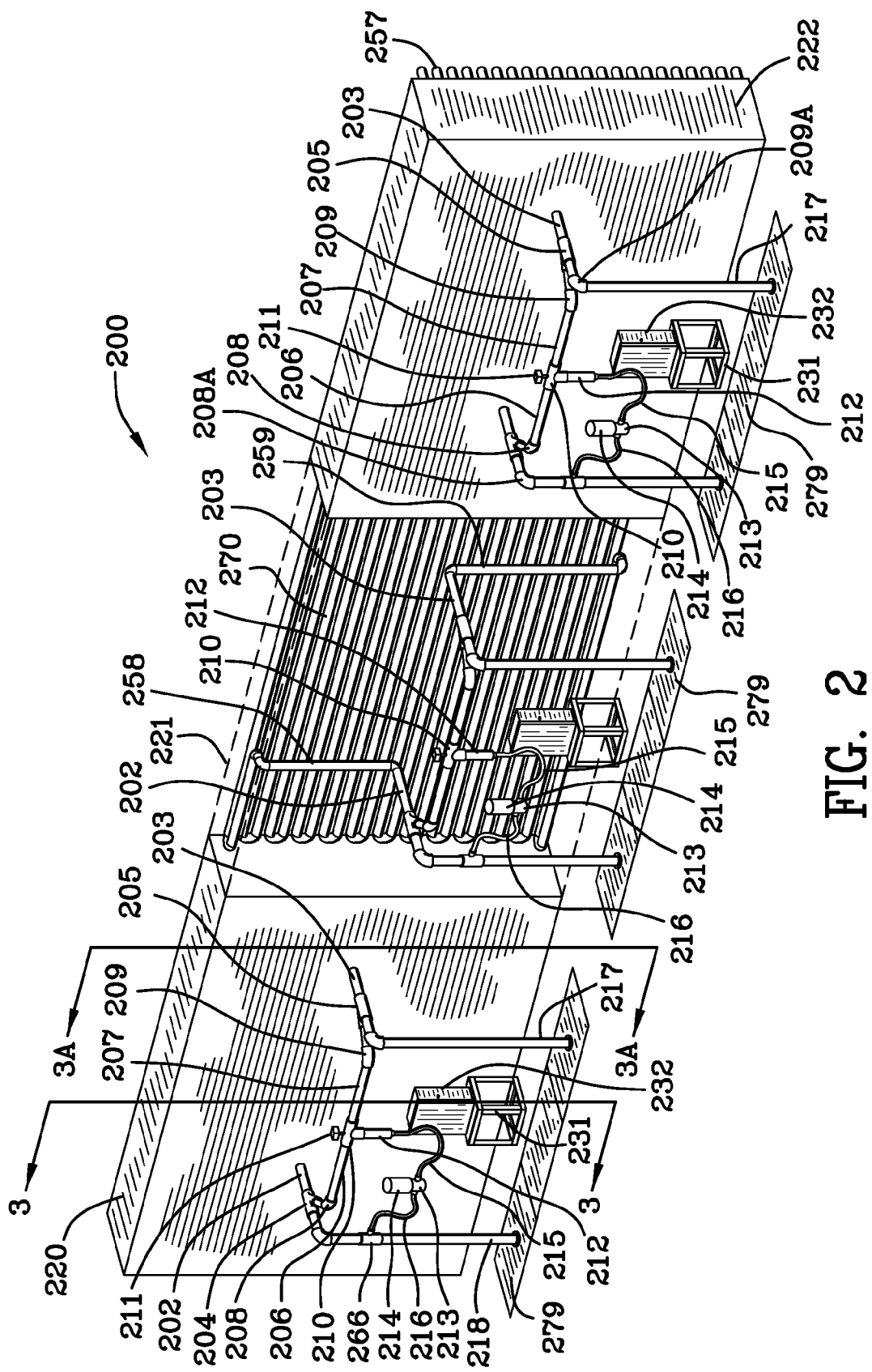
FIG. 2 is a schematic perspective view of three copper coolers (heat exchangers) arranged side by side which make up a portion of a furnace system.

FIG. 2 is a schematic perspective view 200 of three copper coolers 220, 221 and 222 arranged side by side and which make up a portion of a furnace system. The copper coolers are arranged in a circle such that the molten metal in the furnace is bounded by the copper coolers. Although, in FIGS. 2 and 2A the copper coolers 220, 221 and 222 appear to be in a straight line they are actually slightly curved and/or they are arranged in a slightly curved pattern. Alternatively, the copper coolers can be arranged in a straight manner. Furnaces may be circular or rectangular.

Figure 2A:
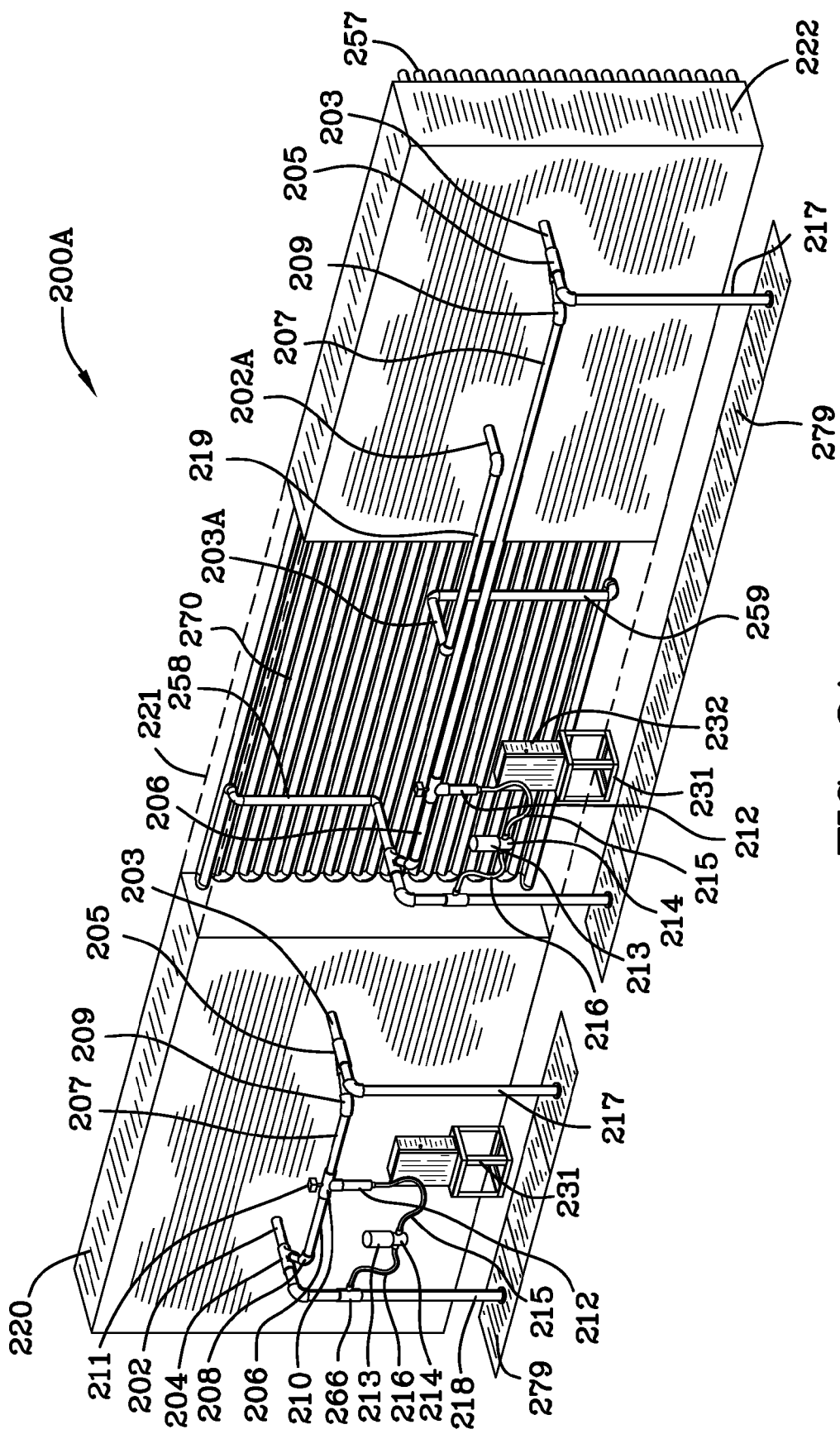
FIG. 2A is a schematic perspective view of three copper coolers with two coolers interconnected together.

FIG. 2A is a schematic perspective view 200A of three copper coolers 220, 221 and 222 with two coolers 221, 222 interconnected together. In the arrangement of FIG. 2A, the thermal ball 280 traverses two coolers 221, 222 and measures temperatures in the heat exchangers of both coolers.

Figure 2B:
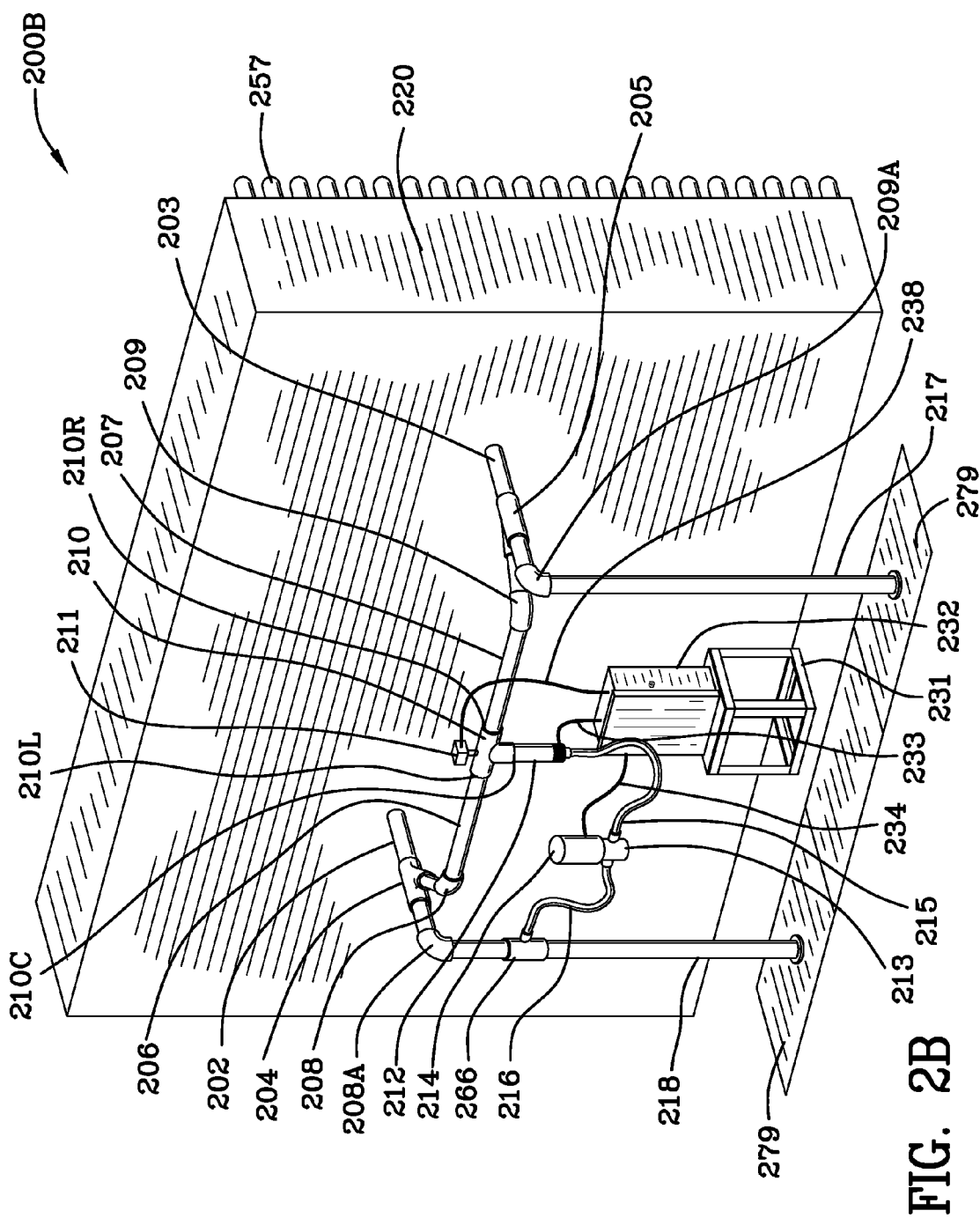
FIG. 2B is an enlargement of one of the copper coolers of FIG. 2.

Referring to FIGS. 2, 2A and 2B, reference numeral 202 indicates the inlet conduit of the heat exchanger and reference numeral indicates the outlet conduit of the heat exchanger of the copper cooler 220. Reference numeral 270 represents all the conduit that comprises the intermediate conduit 270 which is embedded in the copper coolers. Metals are generally good conductors of heat and copper is a good conductor of heat and electricity. Intermediate conduit 270 may be made of copper or some other material of high thermal conductivity and it is in direct contact with the copper block which completely surrounds the intermediate conduit 270. Referring to FIG. 2A, outlet conduit 203A is connected by conduit 219 to inlet conduit 202A of copper cooler 222 to illustrate interconnection of multiple coolers. Any number of coolers may be linked together or daisy-chained together.

Referring to FIG. 2A, copper cooler/heat exchanger 221 illustrates the conduits 258, 259 and 270. The arrangement of the conduits 258, 259 and 270 may be varied and this arrangement is only set forth by way of example. Conduits 258, 259 are arranged vertically and are interconnected with horizontal conduits 270 and inlet conduit 202 and outlet conduit 203, respectively.

FIG. 2B is an enlargement 200B of one of the copper coolers of FIG. 2 and prominently illustrates the first Y strainer 204 interconnected with inlet conduit 202 of the heat exchanger of copper cooler 220 and the second Y strainer 205 interconnected with outlet conduit 203 of the heat exchanger of copper cooler 220. A flexible hose/rigid pipe/conduit 206 interconnects the first Y strainer 204 and the launch port 210L of the three way valve 210. Similarly, a flexible hose/rigid pipe/conduit 206 interconnects the second Y strainer 205 and the retrieve port 210R of the three way valve 210. Fittings 208, 209 are illustrated interconnecting conduits 206, 207.

FIG. 2J is a schematic 200J of the three way valve 210 illustrating receiving port 210R, chamber port 210C and launch port 210L. Each port of the three way valve includes interior threaded connections. The three way valves may be purchased, for example, from VALTORC, along with an actuator therefor. The actuator 211 may be an electric motor or a solenoid as illustrated in the drawing FIGS. 2, 2A and 2B or the actuator may be a pneumatic actuator. Referring to FIG. 2J, the possible port connections are 210C-210L for launch of the thermal ball, 210C-210R for retrieval of the thermal ball, 210L-210R for passage of the thermal ball through the three way valve so that it may re-enter the heat exchanger, and closed wherein no ports are connected to each other and no water flow may pass through the valve. As stated before, the port connections are exclusive meaning, for example, if the actuator positions the three way valve such that ports 210L-210R are connected then there are no other passageways through the three way valve.

Referring to FIGS. 2, 2A and 2B, the thermal ball/heat tracer sensor plastic chamber is preferably cylindrical. A reversible pump 213 is driven by reversible pump motor 214. Pump motor 214 is controlled by the control station 232. Water line 215 communicates water between pump 213 and chamber 212 and water line 216 communicates between water inlet conduit/pipe 218 and pump 213. Fitting 266 resides in the inlet line/conduit 218 which carries the water 330 from the reservoir/sump 330A to the inlet conduit 202 as viewed in FIGS. 3 and 3A. Fitting 206 provides for connection of the pump 213 to the inlet conduit 218. Floor panels 279 cover the tundrish sump/reservoir 330A.

Outlet conduit 203 of the heat exchanger is connected to the second Y strainer 205 which in turn is connected to the return line/conduit 217 which expels the water into the sump 330A Inlet conduit 202 is connected to the first Y strainer 204 which is interconnected to the inlet line/conduit 218. Fittings/elbow 208A, 209A interconnect the conduits 218, 202 and the conduits 217, 203, respectively, as best illustrated in FIG. 2B.

Figure 5:
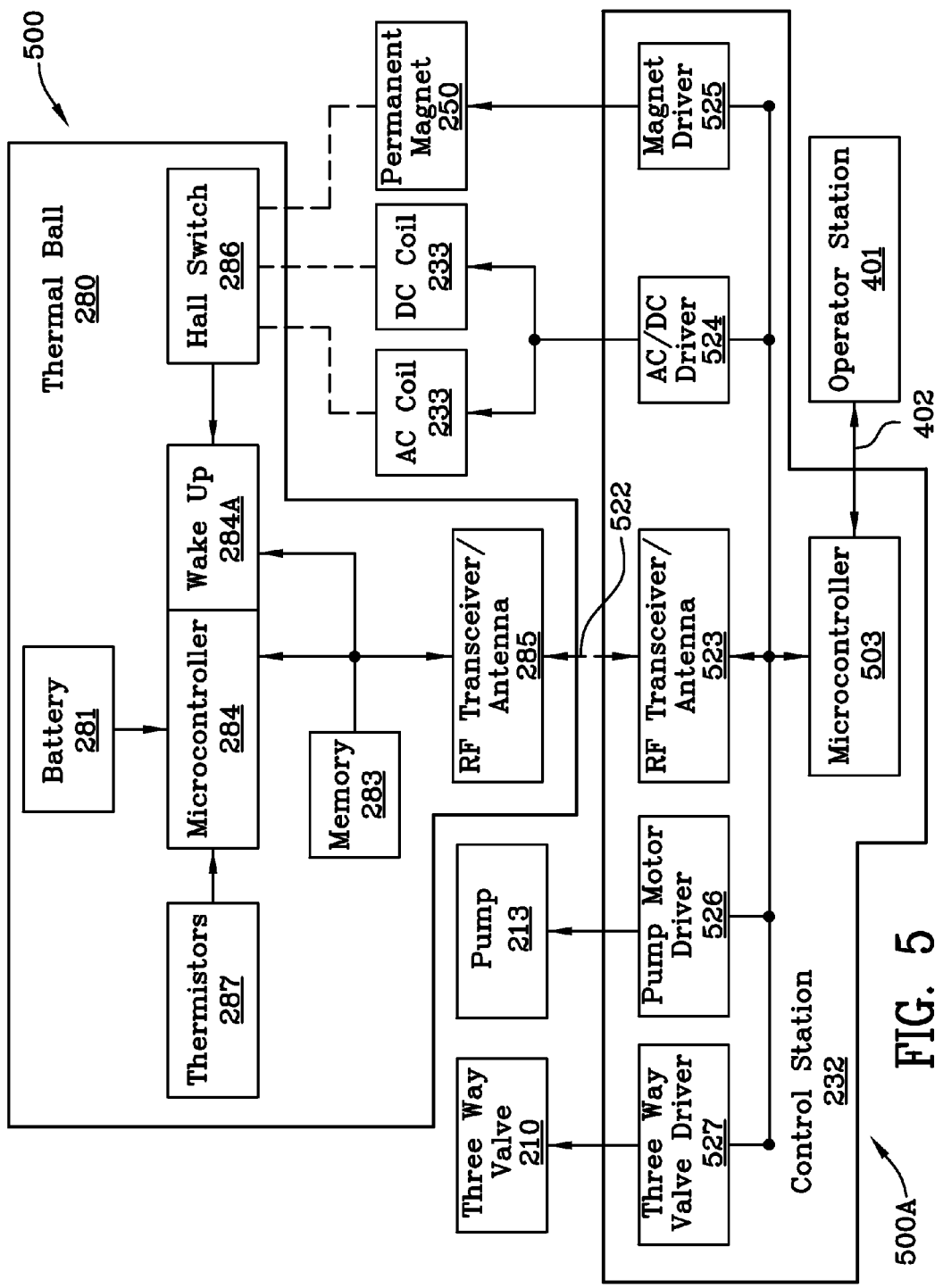
FIG. 5 is a schematic of the thermal ball/heat tracer sensor and the control station

Referring to FIG. 2B, a support 231 positions control station 232 in proximity to plastic chamber 212. Control station 232 is hardwired 238 to the actuator 211 of the three way valve 210. Similarly, pump motor 214 is hardwired 234 to the control station 232. The control station positions the actuator as desired and runs the pump in the direction desired when desired. Power (not shown) is supplied to the control station. FIG. 5 is a schematic 500, 500A of the thermal ball/heat tracer sensor 280 and control station. FIG. 2I is a heat tracer/thermal ball 280 exploded assembly 200I illustrating battery 281, printed circuit board 282, memory 283, micro-controller 284, radio frequency transceiver/antenna 285, hall effect switch 286, thermistors 287 and protective covering 288. The memory 283, micro-controller 284, radio frequency transceiver/antenna 285 and hall-effect switch 286 may be powered down when the thermal ball/heat tracer sensor is not being used.

Generally, the thermal ball is spherically shaped but it is not a perfect sphere in practice and may be somewhat compressed making the equator of the sphere somewhat circumferentially larger than a perfect sphere. The components of the thermal ball 280 are indicated schematically in FIG. 5 as are the components of the control station 232. FIG. 5 illustrates the AC/DC coil 233 driven by an AC or DC driver. Coil 233 includes leads 233A, 233B to which an alternating current or direct current voltage source is connected to activate/deactivate the thermal ball. See FIGS. 2C and 2D. Further magnet driver 525 positions permanent magnet 250 and moves it up and down in slot 252 in support 251 so as to vary the magnetic field within the chamber 212, and, hence vary the magnetic flux experienced by the hall effect switch 286 to activate/deactivate the thermal ball. As previously stated, only one method of activation/deactivation is necessarily employed. Wake up portion 284A of the micro-controller is illustrated in FIG. 5. Hall effect switch 286 communicates with the wake up portion of the micro-controller to: (1) apply operational power to the components of the thermal ball; or, (2) to reduce power to the components of the thermal ball, depending on the operative state of the thermal ball. Alternatively, RF transceiver 285 communicates with the wake up portion 284A of the micro-controller if this method of waking up the thermal ball is employed.

Still referring to FIG. 5, the operator communicates with the micro-controller 503 from an operation station 401 which may be a personal computer or some other operator interface.

The control station includes a micro-controller 503, an RF transceiver/antenna 523 which produces and receives a radio frequency signal 522, AC/DC driver 524 for waking up the thermal ball, a magnet driver 525, a pump motor driver 526 for driving pump 213 in the first and second directions, and a three way valve driver 527 for positioning the three way valve in one of flour possible positions. Reference numeral 522 indicates that the radio communication is bi-directional between transceivers 285, 523.

The heat tracer sensor 280 is a wireless sensing device that is capable of continuously monitoring the integrity of furnaces by measuring the temperature of water in the conduits 202, 258, 270, 259, 203 of the heat exchanger (copper cooler 220). The heat tracer sensor 280 reports the temperature measurement as a function of position in the heat exchanger conduits to the operator to enhance operation efficiency, reduce environmental impacts, and improve safety.

For example, the diameter of the heat tracer sensor 280 is approximately 0.75". Other sized heat tracer sensors/thermal balls may be used depending on the particular application. A printed circuit board (PCB) 282 serves as the platform for the electronics mounted within the heat tracer sensor 280. The term "thermal ball" is used equivalently with the term "heat tracer sensor". The heat tracer sensor includes a battery 281 for powering the electronics, a thermistor or thermistors 287 for measuring temperature of the water within the heat exchanger conduits, a hall effect switch 286, a micro-controller 284 for controlling the heat tracer sensor 280, a wireless radio frequency transceiver/antenna 285 for receiving commands and offloading data, and a solid state flash memory 283 for storing sensor data.

The battery 281 is never recharged, instead, the battery is switched on and off using one of four techniques. There are four ways of activating the thermal ball. The first way of activating (powering up into the operational mode) and deactivating (powering down into the sleep mode) the thermal ball is performed using a radio frequency transceiver/antenna 285 within the thermal ball which communicates with a radio frequency transceiver/antenna 523 located in a control station 232 in proximity to the cylindrical plastic chamber 212 which, under certain circumstances, retains the thermal ball 280. The second way of activating the thermal ball is performed using a permanent magnet 250 movably mounted 251 in proximity to the plastic chamber 212 within which the thermal ball resides. The permanent magnet 250 is slidably movable in a groove 252 in support 251 between first and second positions. As the permanent magnet 250 is moved, the magnetic field inside the plastic chamber changes and acts on the hall effect switch 286 changing the state of one or more outputs of the hall effect switch, which, in turn activates or deactivates the battery power supply. When the switch is activated, then the necessary operational power is supplied to the components mounted on the printed circuit board. When the switch is deactivated, then power is substantially reduced and the thermal ball/heat transfer sensor goes into the sleep mode consuming a small amount of power. The third way of activating/deactivating the thermal ball is performed using a coil of wire 233, such as a copper coil, wrapped around a plastic chamber 212 which houses the heat tracer sensor and applying 524 alternating current to the coil 233 which then produces a magnetic field within the plastic chamber 212 which in turn is sensed by the hall effect switch 286. The fourth way of activating the thermal ball 212 is the same as the third way only a direct current is applied to the coil 233 wrapped around the plastic chamber 212 to activate/deactivate the hall effect switch.

The thermal ball circulates inside the heat exchanger water conduits 202, 258, 270, 259, 203 of a heat exchanger such as copper cooler and measures the temperature profile inside the water conduits as a function of time and hence position within the heat exchanger/copper cooler. Copper coolers are widely used in the mining industry to protect the structural sidewalls of non-ferrous furnaces. The thermal ball can be operated continuously or periodically to monitor the integrity of a furnace.

The thermal ball reports the thermal profile inside a copper cooler wirelessly to control station 232 located in proximity to plastic chamber 212. The thermal profile is a map of temperature versus location in the conduits within a copper cooler. The operator, using data supplied by the thermal ball 280, deduces the condition of the sidewall of the furnace based on the temperature of the water in the conduits of the heat exchanger within the copper cooler and determines whether a burn through is imminent.

The thermal ball provides an accurate thermal profile inside the heat exchanger conduits of the copper cooler and can identify hot spots in the wall of the furnace giving the exact copper cooler experiencing the hot spot, and the location within the copper cooler where a burn through may occur. The location is identified by utilizing a clock associated with the micro-controller 284 on board the thermal ball 280 and the known speed of the ball through the conduits of the heat exchanger. The known speed of the thermal ball is determined by experimentation and then used in an algorithm to correlate the location of the ball within the conduits of the heat exchanger/copper coolers as a function of time of flight. Several data points as a function of time and, hence, distance are recorded in the memory device on board the copper cooler. Preventive maintenance in the identified area can take place or process changes can be effected without shutting down the entire furnace for repair.

The thermal ball is launched from and received into a chamber. An electric reversible small pump 213, interconnected with the chamber 212 and the inlet conduit 218 of the heat exchanger together with the positioning of the three way valve 210 controls the launch of the thermal ball. The small pump creates a small differential pressure in either the hose/pipe/tubing 206 connected to the first inlet Y strainer 204 or in the hose/pipe/tubing 207 connected to the second outlet Y strainer 205 conduit to pull or push the thermal ball in the desired direction. This differential pressure launches the thermal ball into the inlet conduit 202 or extracts it from the outlet conduit 203 in combination with the desired positioning of the three way valve 210. The thermal ball is propelled by the water flowing through the conduits of the heat exchanger once it is launched into the conduits of the heat exchanger and moves through the inlet conduit 202, the riser conduit 258, the intermediate conduit 270 the riser conduit 259 and exits through the outlet conduit 203. Riser conduits 258 and 259 are considered as part of the intermediate conduit.

The copper cooler heat exchanger is typically made of copper and typically includes a 1 inch schedule 40/80 conduit inserted into a copper block. Other size conduits may be used. The copper blocks are on the outside of the refractory furnace wall relative to the center of the furnace.

The thermal ball is dormant when not in use and resident in the plastic chamber. The thermal ball is activated/deactivated by a permanent magnet 250, AC/DC coil 233, or by a radio frequency signal. Activation powers the thermal ball to an operational power level. Deactivation powers the thermal ball to a low power level (sleep mode). When the operator desires an inspection of the heat exchanger of the copper cooler, the operator or computer program initiates operation of the pump 213 in the forward first pumping direction and the three way valve is positioned in the first configuration for interconnection of the chamber port 210C and the launch port 210L propelling water and the thermal ball into the first inlet Y strainer 204 connection in the inlet conduit 202 and the thermal ball then traverses the conduits embedded in the heat exchanger/copper cooler and exits the heat exchanger in the outlet conduit 203 through a second outlet Y strainer 205 connection. During each cycle of use of the thermal ball 280, and after the thermal ball 280 is propelled into the first Y strainer 204 connection in the inlet conduit 202 of the heat exchanger, the pump 213 reverses direction and pumps fluid in the second direction from the second outlet Y strainer 205 connection back to the retrieve port 210R and through three way valve 210 and out the chamber port 210C and into the plastic chamber 212. With the pump operating in the second direction, the three way valve 210 moves to the second position allowing fluidic communication between the pump 213 and the second outlet Y strainer 205 connection. In this condition, a pressure lower than the water pressure at the outlet conduit 203 of the heat exchanger/copper cooler is created by the pump's suction. The thermal ball is entrained in the fluid flowing out of the heat exchanger/copper cooler outlet 203 and moves therewith.

Plastic chamber 212 includes a barrier which may be a screen or other device to prohibit the thermal ball from being pulled into the pump 213. Alternatively, the conduit 215 extending between the chamber 212 and the pump 213 may be smaller in diameter than the thermal ball's diameter and this will prevent the thermal ball from entering the pump. Preferably, a screen is employed to prevent the ball from exiting the chamber. When the thermal ball is returned to the plastic chamber, it has stored temperature data based on its traversal of the copper cooler heat exchanger. The three way valve and the pump are controlled by a micro-controller 503 which may be controlled from a remote location over the internet. The speed of the ball through the copper cooler is known and the time of travel through the heat exchanger conduits is known. The length of the heat exchanger element through the copper cooler is also known. These three parameters determine the location in the copper cooler of a burn through, an imminent burn through or a location to be examined further. These three parameters also allow the operator to determine the operating heat flux of the furnace bath which indicates the state of the process of the furnace. In this way, effective maintenance of the copper cooler can be performed should one of these conditions exist. When the thermal ball resides in the plastic chamber, it is kept stationary. The thermal ball may then be interrogated and the data removed wirelessly by the RF transceivers/antennas of the thermal ball and the control station.

FIG. 2C is an enlargement 200C of heat tracer chamber 212 with the coil 233 wrapped therearound. FIG. 2D is an enlargement 200D of plastic chamber 212 with coil 233 wrapped therearound with a portion of the chamber cut-away illustrating the thermal ball 280 therein. Leads 233A, 233B of the coil are interconnected with either an alternating current power source or a direct current power source. Plastic chamber 212 is cylindrically shaped and is threadedly engaged with chamber port 210C of the three way valve 210.

FIG. 2E is an enlargement 200E of plastic chamber 212 with the DC magnet 250 in proximity thereto. FIG. 2F is an enlargement 200F of plastic chamber 212 with the DC magnet 250 in proximity thereto with a portion of the chamber cut-away illustrating thermal ball therein.

Figure 2H:
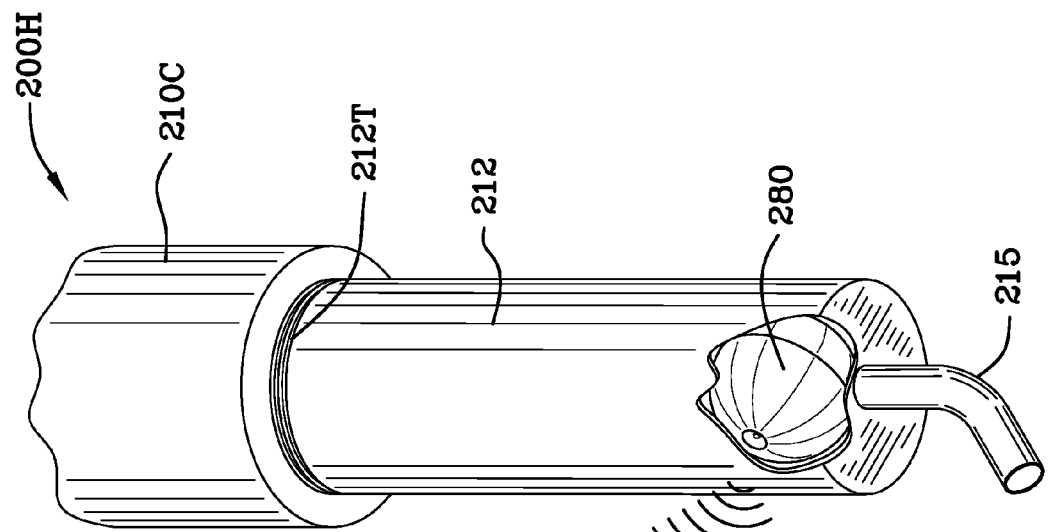
FIG. 2H is an enlargement of the plastic chamber illustrating a radio frequency signal being generated therefrom with a portion of the plastic chamber cut-away illustrating thermal ball/heat tracer sensor therein.
Figure 2G:
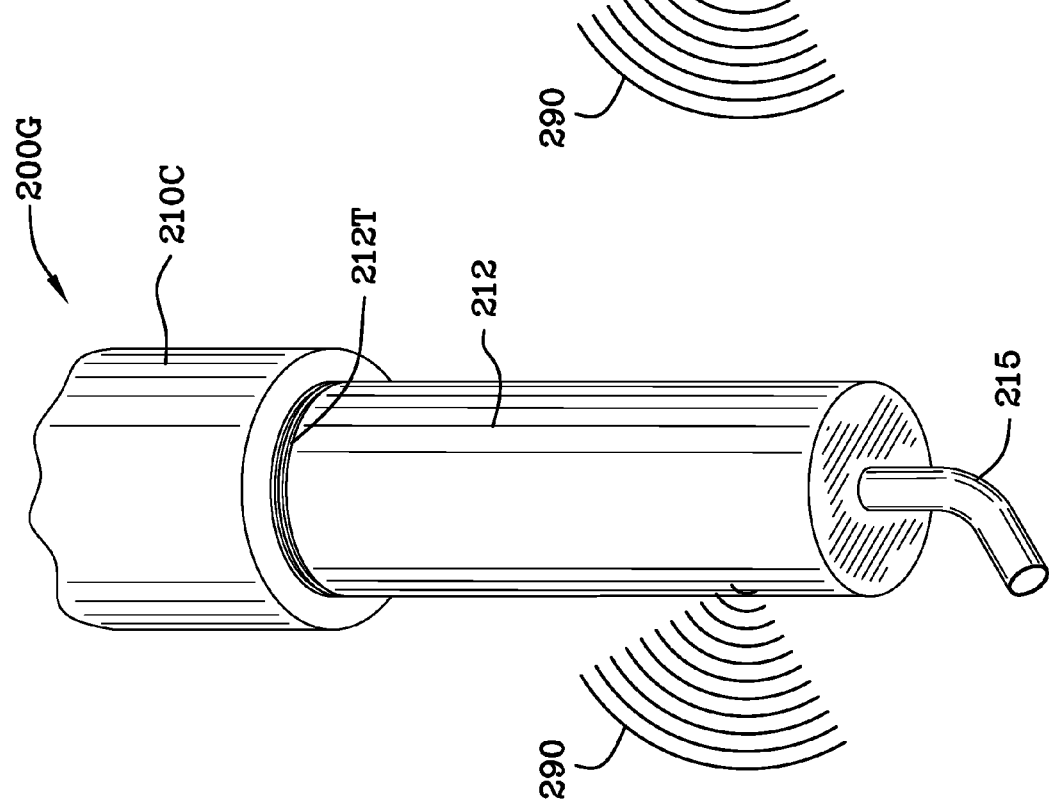
FIG. 2G is an enlargement of the plastic chamber illustrating a radio frequency signal being generated from the thermal ball/heat tracer sensor within the chamber therefrom.

FIG. 2G is an enlargement 200G of plastic chamber 212 illustrating a radio frequency signal 290 being generated from the thermal ball/heat tracer sensor within the chamber 212. FIG. 2H is an enlargement 200H of plastic chamber 212 illustrating a radio frequency signal 290 being generated therefrom with a portion of the chamber cut-away illustrating the thermal ball/heat tracer sensor therein. Reference numeral 290 depicts the radio frequency signal transmission from the thermal ball. The diameter of the cylindrical plastic chamber 212 is shown in FIGS. 2F and 2H to be slightly larger than the diameter of the spherical thermal ball, however, a plastic chamber considerably larger in diameter may be used.

Figure 3:
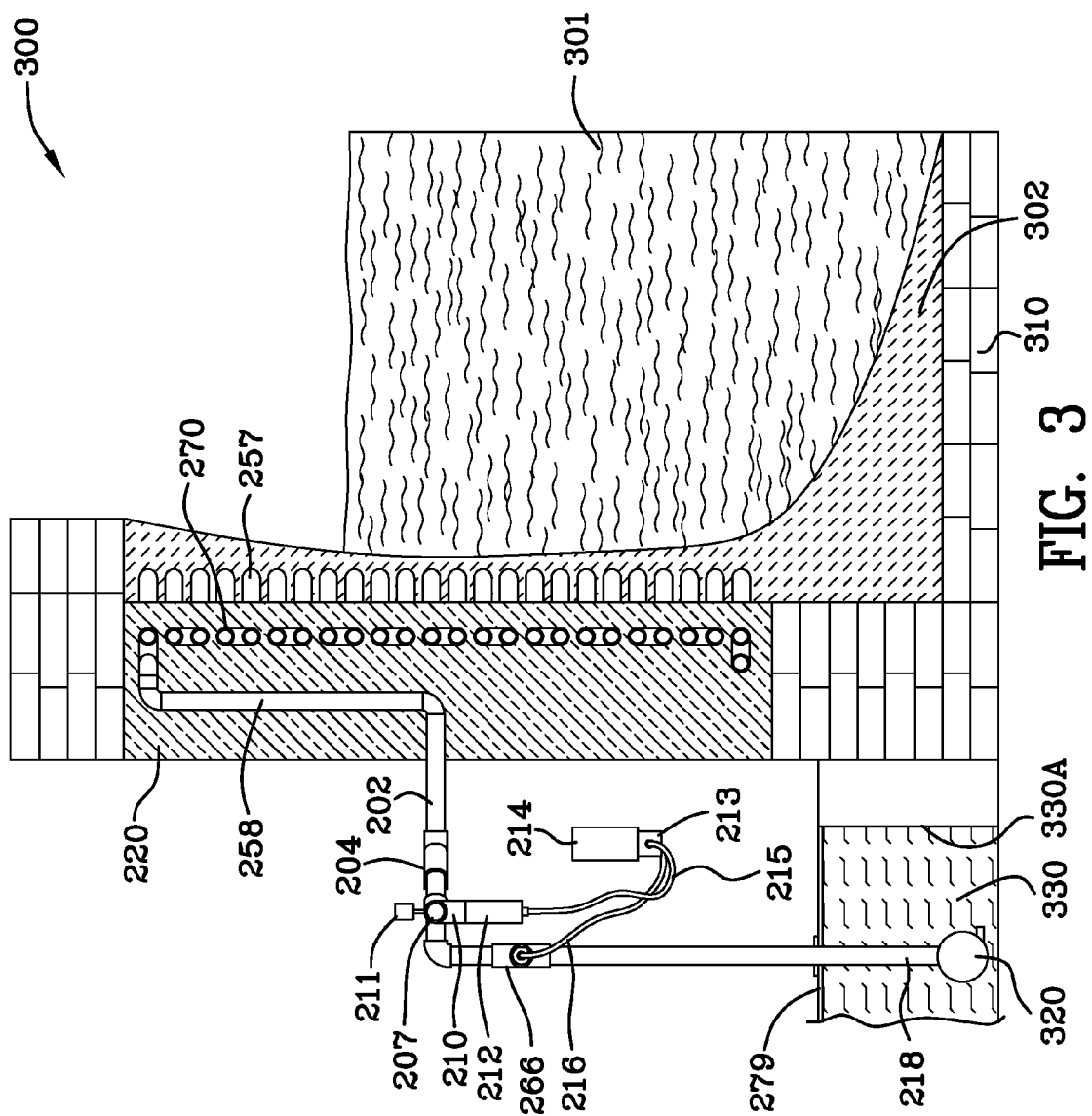
FIG. 3 is a cross-sectional view of a furnace, a copper cooler, tubing and a heat tracer system taken along the lines 3-3 of FIG. 2.
Figure 3A:
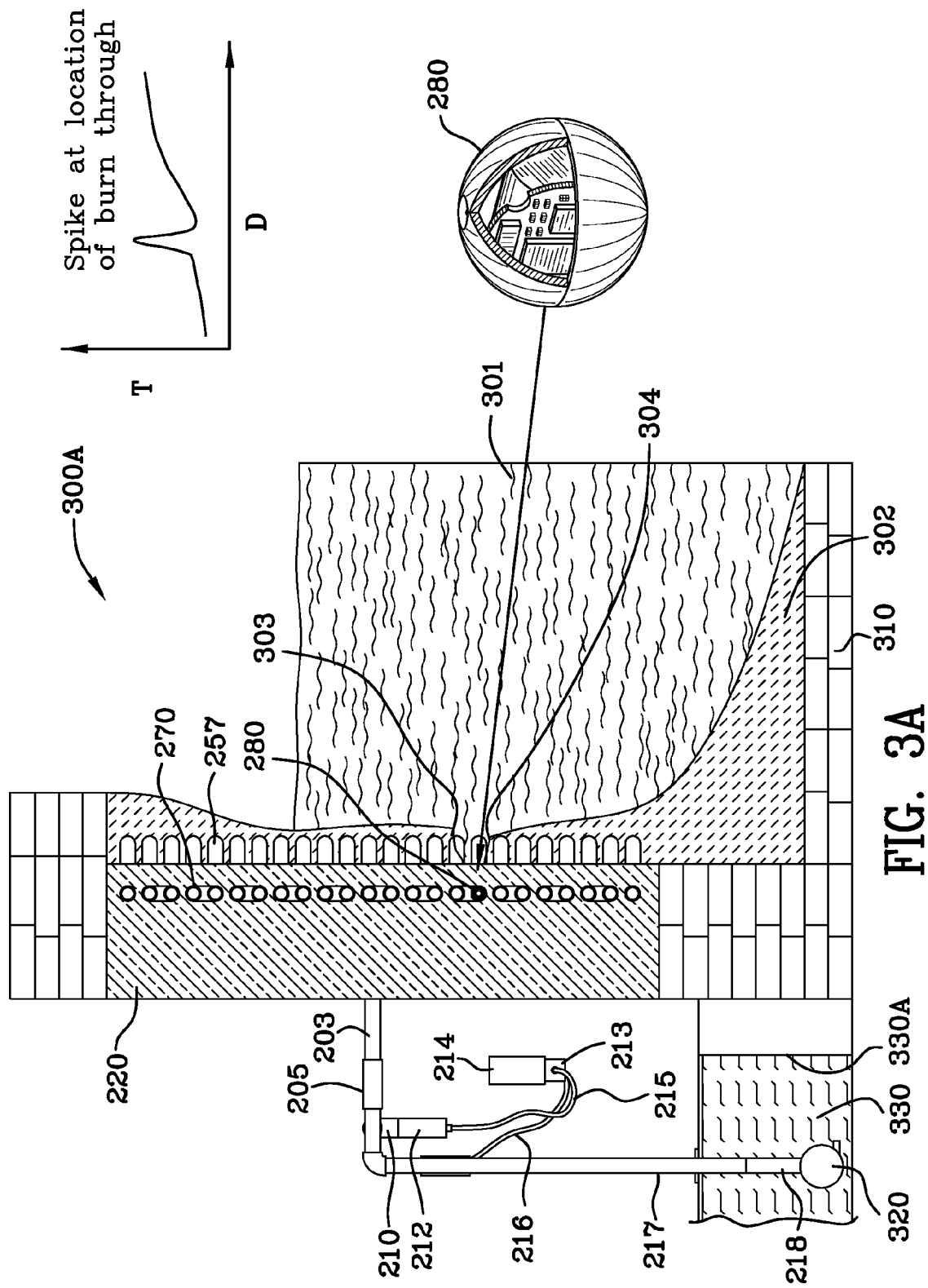
FIG. 3A is a cross-sectional view of furnace, copper cooler, tubing and heat tracer system taken along the lines 3A-3A of FIG. 2.

FIG. 3 is a cross-sectional view 300 of the furnace, copper cooler 220, heat exchanger conduits 202, 258, 270 and heat tracer system taken along the lines 3-3 of FIG. 2. Pump 213 is illustrated as suspended and not supported for the sake of clarity of the drawing. FIG. 3 illustrates molten metal 301 in the furnace together with built up slag 302 which lines the walls of the furnace and, in particular, which also lines the walls of copper cooler 220. Protrusions/studs 257 extend from the interior wall of the copper cooler and facilitate cooling of the furnace as they increase the surface area of the copper cooler. Further, studs 257 promote the formation of slag on the walls of the copper cooler. Refractory 310 is illustrated in FIG. 3 as is the main pump 320, the coolant/water 330 and the sump 330A. FIG. 3A is a cross-sectional view 300A the furnace, copper cooler 220, heat exchanger conduits/tubing 203, 270 and the heat tracer system taken along the lines 3A-3A of FIG. 2. Reference numerals 303, 304 illustrate an opening in the slag 302 creating a hot spot in the intermediate conduit 270 of the heat exchanger. At that position, a spike at the burn through location is indicated when the heat tracer sensor 280 data is downloaded to the control station as indicated in FIG. 4.

Figure 4:
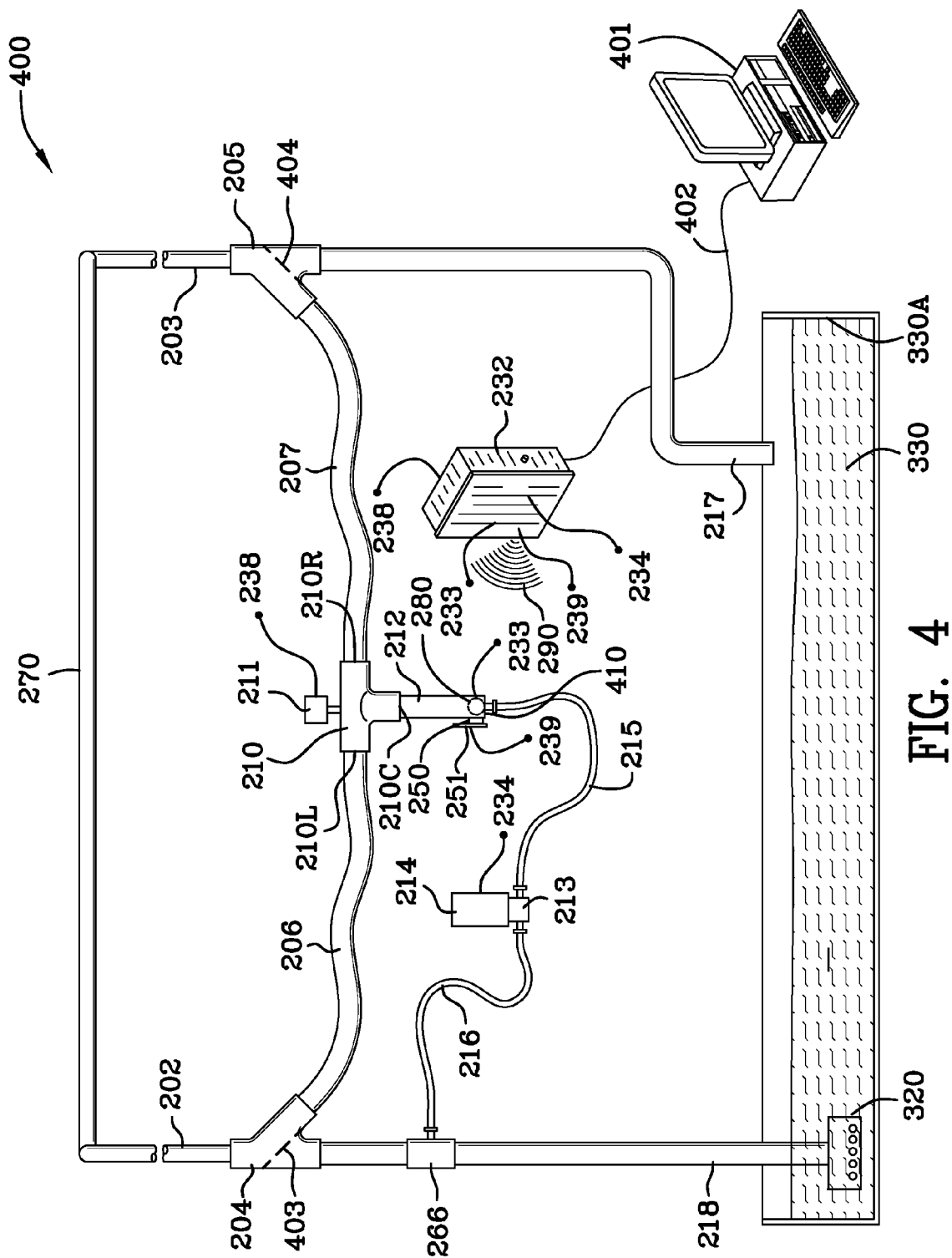
FIG. 4 is a schematic of the heat tracer monitoring system illustrating a remote operator station, control station, chamber, reversible pump, thermal ball, three way valve, and Y strainers.

FIG. 4 is a schematic 400 of the heat tracer monitoring system illustrating remote operator station 401, control station 232, chamber 212, reversible pump 213, thermal ball 280, three way valve 210, and Y strainers 204, 205. Control station 232 communicates with the thermal ball 280. Communication line 402 runs between the remote operator station 401 and the control station 232. FIG. 4 illustrates screens 403, 404 residing within first 204 and second 205 Y strainer connections. Screens 403, 404 ensure that the thermal ball does not enter the sump 330A. Screen 410 resides at the bottom or end portion of the plastic chamber 212. FIG. 4 illustrates use of the permanent magnet 250, the coil 233, and the radio frequency signal 290 as alternative methods for waking up the thermal ball 280, In FIG. 4, the hardwire interconnection 238 between the control station 232 and the actuator is shown terminating in a "dot" so as to keep the illustration uncluttered. Like reference numerals such as 238 with a termination "dot" are in reality interconnected together but are shown separately for clarity. Similarly, reference numeral 234 with a termination "dot" is illustrated as interconnecting with the control station. Reference numeral 239 refers to the driver for the permanent magnet. All four methods of waking up the thermal ball are illustrated in FIG. 4, to with, DC coil operation, AC coil operation, DC magnet, and radio frequency transceiver/antenna communication. Only one method is needed and only one method will ordinarily be used unless a back up is desired.

Figure 6:
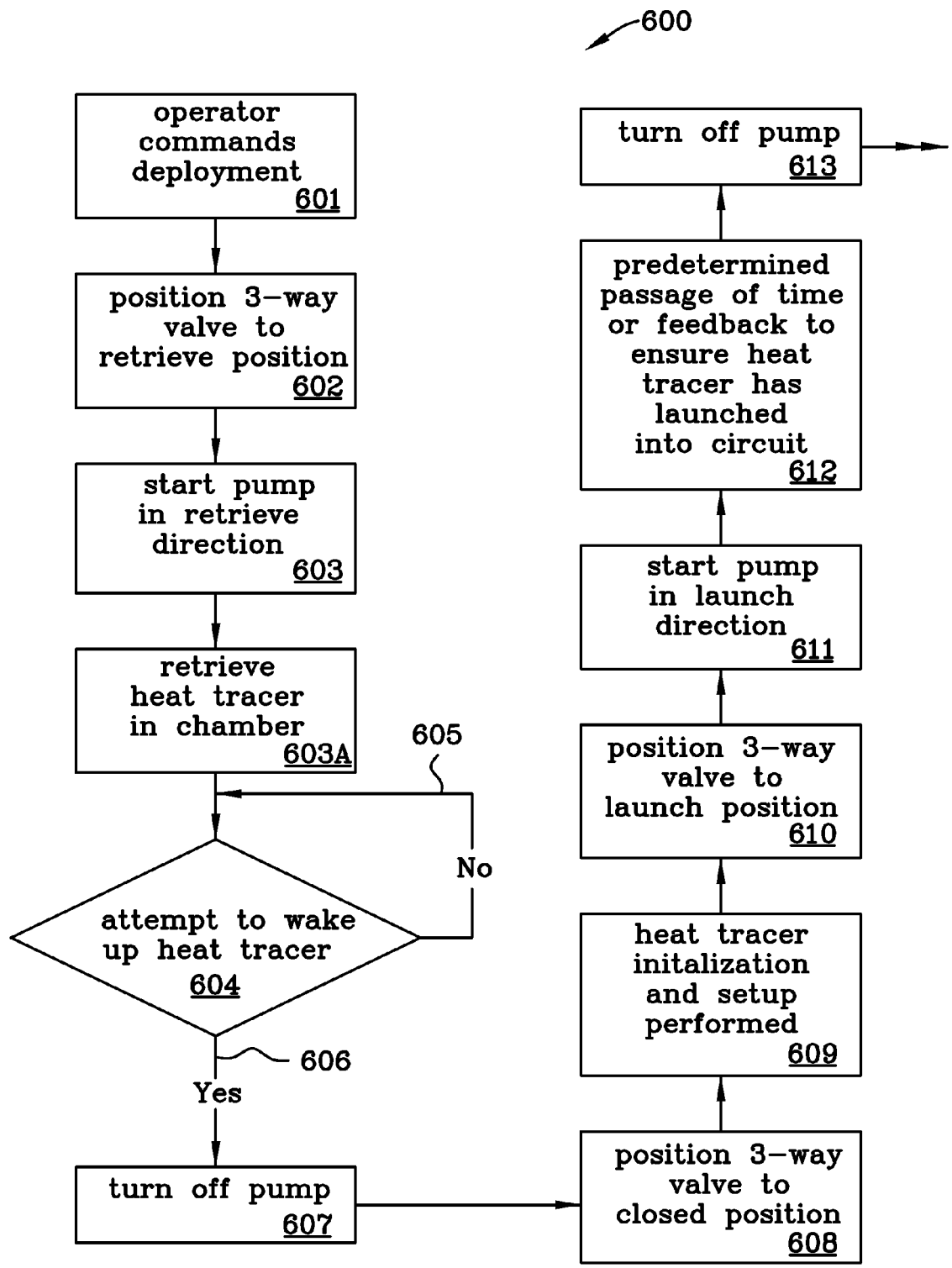
FIG. 6 is a schematic/block diagram of the operation of the heat tracer/thermal ball system.
Figure 6A:
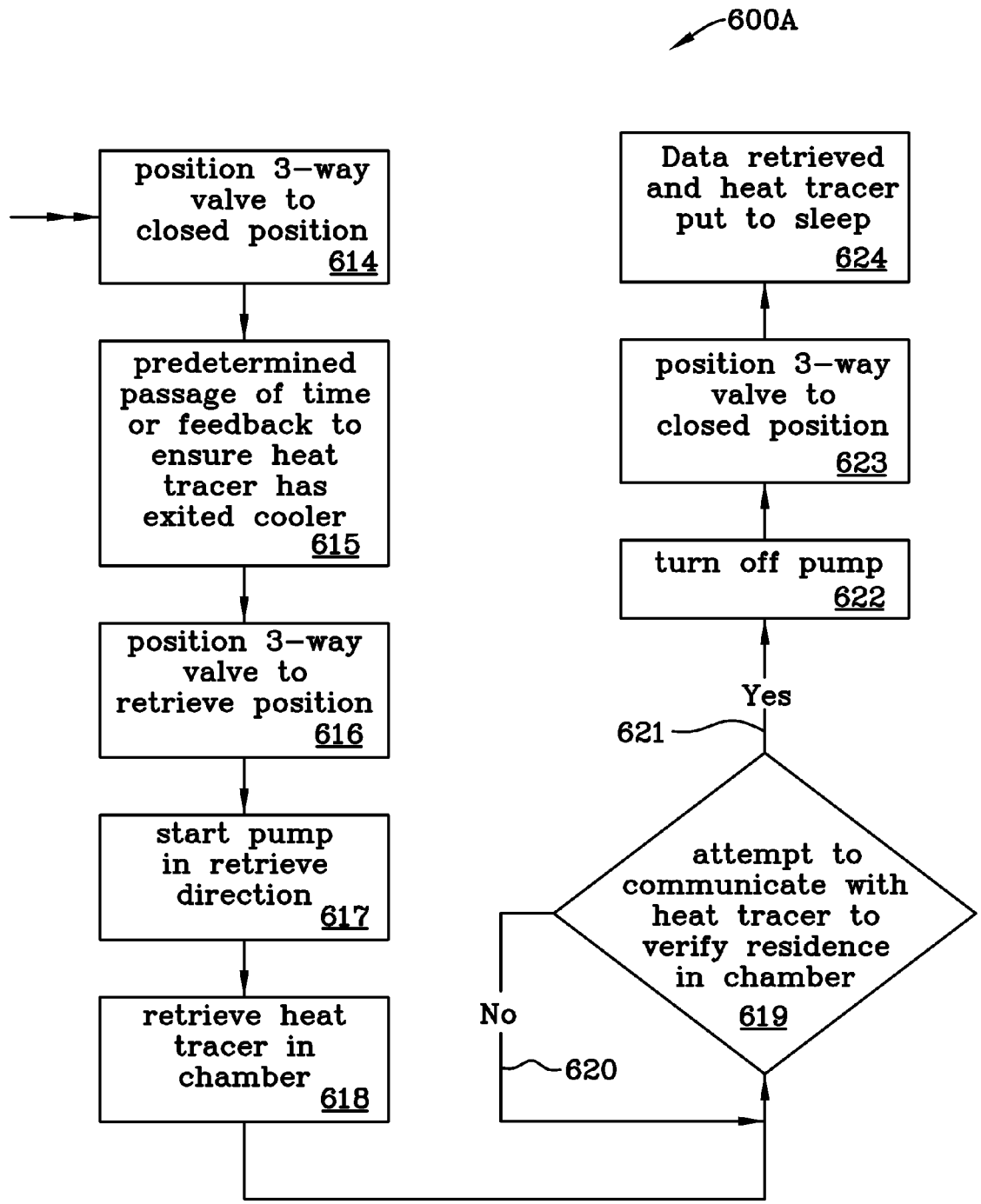
FIG. 6A is a continuation of the schematic/block diagram of FIG. 6.

FIGS. 6 and 6A are schematic/block diagrams 600, 600A of an example of the operation of the heat tracer/thermal ball system. Referring to FIG. 6, one example of the operation of the system is set forth. The operator commands deployment of thermal ball 601 and the actuator 211 positions three way valve 210 to the second position 602 establishing a passageway in the three way valve between retrieve port 210R and chamber port 210C. Next, the small heat tracer sensor pump is started 603 in the second retrieve direction such that water and the heat tracer sensor exit the outlet conduit 203 of the heat exchanger via the second outlet Y strainer connection 205, line/conduit 207 and into and through the three way valve via ports 210R-210C where they enter the plastic chamber 212. The step of retrieving the heat tracer 603A is illustrated in FIG. 6.

It should be noted that the process could be deemed to begin once the heat tracer sensor is resident in the plastic chamber 212. Once the heat tracer sensor is resident in the plastic chamber 212, the next step is to attempt to wake up heat tracer/thermal ball 604. If the first attempt to wake up the heat tracer/thermal ball is unsuccessful, another attempt 605 is made. Once the heat tracer/thermal ball is awake 606, the pump 214 is turned off 607. Next the three-way valve is positioned to its fourth configuration to closed position 608.

When the operator desires an inspection/measurement of the temperature within the conduits of the heat exchanger to be made, the heat tracer sensor/thermal ball is initialized and setup is performed 609. Next the control station positions the three-way valve in the first configuration—the launch configuration 610 whereby chamber port 210C and launch port 210L are connected enabling passage of the thermal ball therebetween. Next, the heat tracer sensor pump 213 is started in the first launch direction 611. After a predetermined passage of time or feedback to ensure that the heat tracer/thermal ball has launched into the inlet conduit 612 of the heat exchanger, the pump is turned off 613 and the three way valve is positioned in its fourth closed position 614.

After a predetermined passage of time or feedback to ensure that the heat tracer sensor 280 has exited the outlet conduit 615, the control station positions the three-way valve to the second configuration, the retrieve position 616, allowing ports 210R and 210C to communicate and the small sensor pump 613 is started in the second retrieve direction 617 enabling the heat tracer sensor/thermal ball to be retrieved 618 in plastic chamber 212.

The control station 232 attempts to communicate with the heat tracer sensor to verify residence in chamber 619 and another attempt to communicate with the heat tracer sensor to verify residence in chamber is made 620 if verification cannot be made. If the heat tracer sensor/thermal ball is verified as being in chamber 621, the heat tracer sensor pump 622 is turned off. Next, the control station causes the actuator 211 to position the three-way valve to closed position 623 and then data is retrieved from the heat tracer sensor and the heat tracer sensor is put to sleep 624.

Another example of the process follows. The process for measuring the performance of a heat exchanger includes using the actuator 211 to position the three-way valve 210 creating a passageway for the heat tracer sensor between a chamber port 210C of the three way valve 210 and a launch port 210L of the three way valve. As stated previously, the launch port 210L of the three way valve 210 is in fluidic communication with a first Y strainer 204 connection in the inlet conduit 202 of the heat exchanger. The process further includes launching, using the small reversible pump 213 interconnected with the chamber and the inlet conduit of the heat exchanger operated in a first flow direction, the heat tracer sensor 280 from the chamber 212 into and through the three way valve 210 and into and through the first Y strainer 201 connection and into the inlet conduit 202 of the heat exchanger. Further, the process includes forcing, using a coolant pump 320, the heat tracer sensor 280 through the inlet conduit 202 of the heat exchanger, the intermediate conduit 270 of the heat exchanger, and into the outlet conduit 203 of the heat exchanger. The three-way valve 210 is then repositioned creating a passageway for the heat tracer sensor between the retrieve port 210R of the three way valve and the chamber port 210C of the three way valve. The retrieve port 210R of the three way valve is in fluidic communication with a second Y strainer 205 connection in the outlet conduit 203 of the heat exchanger.

The process further includes retrieving, using the small reversible pump 213 interconnected with the chamber 212 and the inlet conduit 202 of the heat exchanger operated in a second flow direction, the heat tracer sensor 280 from the outlet conduit 203 into and through the second Y strainer 205 connection in the outlet conduit 203 and into and through the three way valve 210 and into the chamber 212. The process further includes interrogating and downloading, using a control station 232, data and information from the heat tracer sensor 280 residing in the chamber 212. The sensor is then deactivated and the supply of on-board battery power to the components of the heat tracer sensor is substantially reduced. Small amounts of power are used in some of the on-board electronic components in the sleep mode.

Data collected from the heat tracer sensor is analyzed by a computer located remotely from the control station to determine the performance of the heat exchanger. Performance of the heat exchanger is used to infer the performance of the furnace and, in particular, to determine if the side wall has been compromised.

As stated above in connection with the measurement device, the process for measuring the performance of the heat exchanger includes using a first Y connection having a strainer and a second Y connection having a strainer wherein the strainers ensure that the heat tracer sensor remains in the heat exchanger monitoring loop. The strainers 403, 404 ensure that the heat tracer sensor 280 does not fall into the supply conduit 218 and the drain conduit 217.

REFERENCE NUMERALS

100—schematic of cooling pipe which may reside in a copper cooler
100A—schematic of a cooling pipe illustrated in phantom inside a copper cooler
100B—schematic of a copper cooler
100C—schematic of a copper cooler illustrating multiple cooling ports into and out of a cooler
101—copper cooler pipe
102—inlet to cooling pipe
103—exit of cooling pipe
104—end of one pipe interconnecting with another pipe
105—end of one pipe interconnecting with another pipe
106—copper cooler
107, 108, 109, 110, 111, 112, 113, 114—ports for conduits of heat exchanger
200—schematic/perspective view of three copper coolers
200A—schematic/perspective view of three copper coolers with two coolers interconnected
200B—enlargement of one of the copper coolers of FIG. 2
200C—enlargement of heat tracer chamber 212 with coil wrapped therearound
200D—enlargement of heat tracer chamber 212 with coil wrapped therearound with cut-away illustrating thermal ball 280 therein
200E—enlargement of heat tracer chamber 212 with DC magnet in proximity thereto
200E—enlargement of heat tracer chamber 212 with DC magnet in proximity thereto with cut-away illustrating the thermal ball (heat tracer sensor) 280 therein
200G—enlargement of heat tracer chamber 212 illustrating a radio frequency signal 290 being generated from the thermal ball/heat tracer within the chamber therefrom;
200H—enlargement of heat tracer chamber 212 illustrating a radio frequency signal 290 being generated therefrom with a portion of the chamber 212 cut-away illustrating thermal ball/heat tracer 280 therein;
200I—heat tracer/thermal ball exploded assembly
200J—schematic of three way valve illustrating receiving port 210R, chamber port 210C and launch port 210L
202—inlet conduit of heat exchanger/copper cooler 220
202A—inlet conduit of heat exchanger/copper cooler 222
203—outlet conduit of heat exchanger/copper cooler 220
203A—outlet conduit of heat exchanger/copper cooler 221
204—first Y strainer interconnected with inlet conduit/copper cooler 220
205—second Y strainer interconnected with outlet conduit/copper cooler 220
206—flexible hose or rigid pipe interconnecting Y strainer 204 and three way valve 210
207—flexible hose or rigid pipe interconnecting Y strainer 205 and three way valve 210
208, 208A, 209, 209A—fittings
210—three way valve
210C—chamber port of three way valve
210L—launch port of three way valve
210R—retrieve port of three way valve
211—electric motor/solenoid operator of three way valve 210
212—thermal ball/heat tracer plastic chamber
212T—threaded end of plastic chamber 212
213—reversible pump
214—motor of reversible pump
215—water line communicating between pump 213 and chamber 212
216—water line communicating between water inlet line/conduit 218 and pump 213
217—return line/conduit to sump
218—inlet line/conduit from tundrish pump
219—pipe/conduit interconnecting coolers 221 and 222
220, 221, 222—heat exchangers/copper coolers
231—support for control station 232
232—control station
233—coil surrounding plastic chamber 212
233A—first lead of wake up coil 233
233B—second lead of wake up coil 233
234—electric line controlling motor/solenoid of three way valve 210
250—permanent magnet
251—support
252—slot in support to guide magnet
257—studs promoting formation of slag and promoting cooling on inside of copper cooler
258—vertical inlet conduit/pipe line extending from inlet conduit 202
259—vertical outlet conduit/pipe line extending from outlet conduit 203
266—fitting in the inlet line 218 which enables heat tracer sensor pump suction/discharge
270—intermediate conduit of heat exchanger comprising several horizontal lines connected together within the copper cooler
279—floor panels covering tundrish sump/reservoir
280—heat tracer/thermal ball
281—battery of thermal ball
282—printed circuit board
283—memory
284—micro-controller 284A—wake up portion of micro-controller
285—radio frequency transceiver/antenna
286—hall effect switch
287—thermistors
288—plastic cover of the thermal ball
290—radio frequency waves sent from thermal ball/heat tracer
300—cross-sectional view of furnace, copper cooler, tubing and heat tracer system taken along the lines 3-3 of FIG. 2
300A—cross-sectional view of furnace, copper cooler, tubing and heat tracer system taken along the lines 3A-3A of FIG. 2
301—molten metal
302—slag
303—opening in slag exposing copper cooler
304—opening in slag exposing copper cooler
310—refractory
320—tundrish/coolant/water
330—pump
330A—reservoir
400—schematic of heat tracer monitoring system illustrating remote operator station 401, control station 232, chamber 232, reversible pump 213, thermal ball 280, three way valve 210, and "y" strainers 204, 205
401—remote operator station
402—communication line between control station 232 and operator station 401
403, 404—screens
500—schematic of the control station
500A—schematic of the control station
503—control station micro-controller
522—radio frequency signal
523—RF transceiver/antenna
524—AC/DC driver
525—magnet driver
526—pump motor driver
527—three way valve driver
600—schematic/block diagram of the operation of the heat tracer/thermal ball system
600A—schematic/block diagram of the operation of the heat tracer/thermal ball system (continued)
601—operator commands deployment of thermal ball
602—position three-way valve to retrieve position
603—start pump in retrieve direction
603A—retrieve heat tracer in chamber
604—attempt to wake up heat tracer/thermal ball
605—another attempt to wake up heat tracer/thermal ball
606—heat tracer sensor/thermal ball awake
607—turn off pump
608—position three-way valve to closed position
609—heat tracer sensor/thermal ball initialization and setup performed
610—position three-way valve to launch position
611—start pump in launch direction
612—predetermined passage of time or feedback to ensure heat tracer/thermal ball has launched into circuit
613—turn off pump
614—position three-way valve to closed position
615—predetermined passage of time or feedback to ensure heat tracer has exited cooler
616—position three-way valve to retrieve position
617—start pump in retrieve direction
618—retrieve heat tracer/thermal ball in chamber
619—attempt to communicate with heat tracer to verify residence in chamber
620—another attempt to communicate with heat tracer to verify residence in chamber
621—heat tracer/thermal ball in chamber
622—turn off pump
623—position three-way valve to closed position
624—data retrieved and heat tracer put to sleep The instant invention has been set forth by way of examples. Those skilled in the art will realize that changes may be made to the examples without departing from the spirit and the scope of the claimed invention as set forth in the claims below.

The invention claimed is:

1. A measurement device in combination with a heat exchanger, comprising:
a heat tracer sensor;
a three-way valve;
said three-way valve includes a retrieve port, a chamber port, and a launch port;
a plastic chamber;
said chamber port of said three-way valve being connected to said plastic chamber;
said heat exchanger includes an inlet conduit, an outlet conduit, and an intermediate conduit interconnecting said inlet and outlet conduits;
said heat exchanger includes fluid forced through said inlet conduit, said intermediate conduit and said outlet conduit, and, said fluid has a temperature;
an inlet Y strainer interposed in said inlet conduit of said heat exchanger and said launch port of said three-way valve being interconnected with said inlet Y strainer, said Y strainer guiding said heat tracer sensor into said inlet conduit;
an outlet Y strainer interposed in said outlet conduit of said heat exchanger and said retrieve port of said three-way valve being interconnected with said outlet Y strainer, said Y strainer guiding said heat tracer sensor into said outlet conduit;
said heat tracer sensor travels through said inlet conduit, said intermediate conduit and said outlet conduit of said heat exchanger measuring and storing said temperature of said fluid as a function of time, and said heat tracer sensor being selectively isolated in said plastic chamber;
a control station; and,
said control station communicates with said heat tracer sensor and extracts said stored temperature data therefrom.

2. A process for measuring the performance of a heat exchanger, said heat exchanger having an inlet conduit, an intermediate conduit and an outlet conduit, comprising the steps of:
positioning a heat tracer sensor in a chamber;
activating said heat tracer sensor supplying on-board operational battery power to components of said heat tracer sensor;
positioning a three-way valve creating a passageway for said heat tracer sensor between a chamber port of said three way valve and a launch port of said three way valve, said launch port of said three way valve in fluidic communication with a first Y strainer connection in said inlet conduit of said heat exchanger;
launching, using a reversible pump interconnected with said chamber and said inlet conduit of said heat exchanger operated in a first flow direction, said heat tracer sensor from said chamber into and through said three way valve and into and through said Y strainer connection and into said inlet conduit of said heat exchanger;
forcing, using a coolant pump, said heat tracer sensor through said inlet conduit of said heat exchanger, said intermediate conduit of said heat exchanger, and into said outlet conduit of said heat exchanger;

positioning a three-way valve creating a passageway for said heat tracer sensor between said launch port in fluidic communication with said first Y strainer connection in said inlet conduit of said heat exchanger and said retrieve port in fluidic communication with a second Y strainer connection in said outlet conduit of said heat exchanger of said three way valve;

educating said heat tracer sensor into and through said second Y strainer, said three way valve, and said first Y strainer connection into said inlet conduit of said heat exchanger;

positioning said three-way valve creating a passageway for said heat tracer sensor between said retrieve port of said three way valve and said chamber port of said three way valve, said retrieve port of said three way valve in fluidic communication with said second Y strainer connection in said outlet conduit of said heat exchanger;

retrieving, using said reversible pump interconnected with said chamber and said inlet conduit of said heat exchanger operated in a second flow direction, said heat tracer sensor from said outlet conduit into and through said second Y strainer connection in said outlet conduit and into and through said three way valve and into said chamber;

interrogating and downloading, using a control station, temperature data as measured in intervals of time and distance through said inlet conduit of said heat exchanger, said intermediate conduit of said heat exchanger, and said outlet conduit of said heat exchanger, from said heat tracer sensor residing in said chamber;

deactivating said heat tracer sensor and substantially reducing said supply of on-board battery power from said components of said heat tracer sensor; and, determining the performance of said heat exchanger.

3. A measurement device in combination with a heat exchanger, said heat exchanger includes an inlet conduit, an outlet conduit, and an intermediate conduit interconnecting said inlet and outlet conduits, comprising:

a heat tracer sensor;
a three-way valve;
said three-way valve includes a retrieve port, a chamber port, and a launch port;
a plastic chamber;
said chamber port of said three-way valve being connected to said plastic chamber;
said heat exchanger includes fluid forced through said inlet conduit, said intermediate conduit and said outlet conduit, and, said fluid has a temperature;
said launch port of said three-way valve being interconnected with said inlet conduit of said heat exchanger;
said retrieve port of said three-way valve being interconnected with said outlet conduit of said heat exchanger;
said heat tracer sensor travels through said inlet conduit, said intermediate conduit and said outlet conduit of said heat exchanger measuring and storing said temperature of said fluid as a function of time, and said heat tracer sensor being selectively isolated in said plastic chamber;
a control station;
said control station communicates with said heat tracer sensor and extracts said stored temperature data therefrom;

an inlet Y strainer interposed in said inlet conduit of said heat exchanger and said launch port of said three-way valve being interconnected with said inlet Y strainer; and, an outlet Y strainer interposed in said outlet conduit of said heat exchanger and said retrieve port of said three-way valve being interconnected with said outlet Y strainer.

4. A process for measuring the performance of a heat exchanger, said heat exchanger having an inlet conduit, an intermediate conduit and an outlet conduit, comprising the steps of:

positioning a heat tracer sensor in a chamber, said heat tracer sensor includes a fast response thermistor;

activating said heat tracer sensor supplying on-board operational battery power to components of said heat tracer sensor;

positioning a three-way valve creating a passageway for said heat tracer sensor between a chamber port of said three way valve and a launch port of said three way valve, said launch port of said three way valve in fluidic communication with a first Y connection in said inlet conduit of said heat exchanger;

launching, using a reversible pump interconnected with said chamber and said inlet conduit of said heat exchanger operated in a first flow direction, said heat tracer sensor from said chamber into and through said three way valve and into and through said first Y connection and into said inlet conduit of said heat exchanger;

forcing, using a coolant pump, said heat tracer sensor and coolant through said inlet conduit of said heat exchanger, said intermediate conduit of said heat exchanger, and into said outlet conduit of said heat exchanger;

sensing and recording temperature data, using said heat tracer sensor, in intervals of time and distance, through said inlet conduit of said heat exchanger, said intermediate conduit of said heat exchanger, and said outlet conduit of said heat exchanger;

positioning said three-way valve creating a passageway for said heat tracer sensor between a retrieve port of said three way valve and said chamber port of said three way valve, said retrieve port of said three way valve in fluidic communication with a second Y connection in said outlet conduit of said heat exchanger;

retrieving, using said reversible pump interconnected with said chamber and said inlet conduit of said heat exchanger operated in a second flow direction, said heat tracer sensor from said outlet conduit into and through said second Y connection in said outlet conduit and into and through said three way valve and into said chamber;

interrogating and downloading, using a control station, temperature data as measured in intervals of time and distance through said inlet conduit of said heat exchanger, said intermediate conduit of said heat exchanger, and said outlet conduit of said heat exchanger, from said heat tracer sensor residing in said chamber;

deactivating said heat tracer sensor substantially reducing said supply of on-board battery power to said components of said heat tracer sensor; and, determining the performance of said heat exchanger.

5. A process for measuring the performance of a heat exchanger, said heat exchanger having an inlet conduit, an intermediate conduit and an outlet conduit as claimed in claim 4, wherein the first Y connection includes a strainer and the second Y connection includes a strainer, said strainers ensuring that said heat tracer sensor remains in the heat exchanger monitoring loop.

6. A process for measuring the performance of a heat exchanger, said heat exchanger having an inlet conduit, an intermediate conduit and an outlet conduit as claimed in claim 4, wherein the step of determining the performance of said heat exchanger includes locating any hot spots in the heat exchanger.

7. A process for measuring the performance of a heat exchanger, said heat exchanger having an inlet conduit, an intermediate conduit and an outlet conduit as claimed in claim 4, wherein the steps of activating and deactivating said heat tracer sensor are performed by energizing a coil wrapped around said chamber whereby a hall effect switch on-board said heat tracer sensor changes state.

8. A process for measuring the performance of a heat exchanger, said heat exchanger having an inlet conduit, an intermediate conduit and an outlet conduit as claimed in claim 7, wherein direct current is applied to said coil wrapped around said chamber.

9. A process for measuring the performance of a heat exchanger, said heat exchanger having an inlet conduit, an intermediate conduit and an outlet conduit as claimed in claim 7, wherein alternating current is applied to said coil wrapped around said chamber.

10. A process for measuring the performance of a heat exchanger, said heat exchanger having an inlet conduit, an intermediate conduit and an outlet conduit as claimed in claim 4, wherein the steps of activating and deactivating said heat tracer sensor are performed by moving a permanent magnet in proximity with said chamber.

11. A process for measuring the performance of a heat exchanger, said heat exchanger having an inlet conduit, an intermediate conduit and an outlet conduit as claimed in claim 4, wherein the steps of activating and deactivating said heat tracer sensor are performed by a radio frequency transceiver/antenna in said control station in combination with a radio frequency transceiver/antenna located in said heat tracer sensor.

12. A process for measuring the performance of a heat exchanger, said heat exchanger having an inlet conduit, an intermediate conduit and an outlet conduit as claimed in claim 4, wherein said step of sensing and recording temperature data includes sensing and recording temperature data at a plurality of locations in said inlet conduit of said heat exchanger, said intermediate conduit of said heat exchanger, and said outlet conduit of said heat exchanger.

13. A process for measuring the performance of a heat exchanger, said heat exchanger having an inlet conduit, an intermediate conduit and an outlet conduit as claimed in claim 4, wherein said steps of said process are repeated, periodically, and said downloaded temperature data is compared to previously downloaded temperature data.

14. A measurement device in combination with a heat exchanger, said heat exchanger includes an inlet conduit, an outlet conduit, and an intermediate conduit interconnecting said inlet and outlet conduits, comprising:
   a heat tracer sensor;
   a three-way valve;
   said three-way valve includes a retrieve port, a chamber port, and a launch port;
   a plastic chamber;
   said chamber port of said three-way valve being connected to said plastic chamber;
   said heat exchanger includes fluid forced through said inlet conduit, said intermediate conduit and said outlet conduit, and, said fluid has a temperature;
   said launch port of said three-way valve being interconnected with said inlet conduit of said heat exchanger;
   said retrieve port of said three-way valve being interconnected with said outlet conduit of said heat exchanger;
   said heat tracer sensor travels through said inlet conduit, said intermediate conduit and said outlet conduit of said heat exchanger measuring and storing said temperature of said fluid as a function of time, and said heat tracer sensor being selectively isolated in said plastic chamber;
   a control station;
   said control station communicates with said heat tracer sensor and extracts said stored temperature data therefrom;
   a reversible pump operable in a first direction and a second direction;
   said heat tracer sensor initially residing in said plastic chamber;
   said control station controls operation of said reversible pump in said first and second directions;
   said reversible pump interconnected with said inlet conduit of said heat exchanger, operating in said first direction, extracts water from said inlet conduit of said heat exchanger and forces said water and said heat tracer sensor in a first direction into and through said plastic chamber, said chamber port of said three way valve, said launch port of said three way valve and into said inlet conduit whereby said heat tracer sensor traverses said intermediate conduit; and,
   said reversible pump interconnected with said plastic chamber, operating in said second direction, extracts said water and said heat tracer sensor from said outlet conduit of said heat exchanger and forces said water and said heat tracer sensor in a second direction into and through said retrieve port of said three way valve, said plastic chamber port of said three way valve, and into said plastic chamber whereby said heat tracer sensor is deposited therein, said reversible pump operating in a second direction forces said water in said second direction into and through said inlet conduit of said heat exchanger.

15. A measurement device in combination with a heat exchanger as claimed in claim 14, further comprising:
   said control station controls said three-way valve;
   said control station selectively positions said three way valve allowing communication between said chamber port of said three way valve and said launch port of said three way valve to permit launch of said heat tracer from said plastic chamber into said inlet conduit of said heat exchanger with said reversible pump operating in said first direction; and,
   said control station selectively positions said three way valve allowing communication between said retrieve port of said three way valve and said chamber port of said three way valve to permit extraction of said heat tracer from said outlet conduit of said heat exchanger with said reversible pump operating in said second direction.

16. A measurement device in combination with a heat exchanger as claimed in claim 15, further comprising:
   said heat tracer sensor includes a battery, a fast response thermistor, a radio frequency transceiver/antenna, a micro-controller, and a memory device;

said battery applying power to said thermistor, said radio frequency transceiver/antenna, said micro-controller and said memory device;

said heat tracer sensor includes a hall effect switch; and, said hall effect switch controls said power of said battery applied to said thermistor, said radio frequency transceiver/antenna, said micro-controller, and said memory device.

17. A measurement device in combination with a heat exchanger as claimed in claim 16, further comprising:

a coil wound around said plastic chamber; and, said control station applying a direct current to said coil wound around said plastic chamber to activate said hall effect switch controlling said power of said battery applied to said heat tracer sensor.

18. A measurement device in combination with a heat exchanger as claimed in claim 16, further comprising:

a coil wound around said plastic chamber; and, said control station applying an alternating current to said coil wound around said plastic chamber to activate said hall effect switch controlling said power of said battery applied to said heat tracer sensor.

19. A measurement device in combination with a heat exchanger as claimed in claim 15, further comprising:

said heat tracer sensor includes a battery and a radio frequency transceiver/antenna;

said battery supplying power to said radio frequency transceiver; and, said control station includes a radio frequency transceiver/antenna for communicating with said radio frequency transceiver/antenna of said heat tracer controlling the amount of power of said battery supplied to said heat tracer sensor.

20. A measurement device in combination with a heat exchanger as claimed in claim 15, further comprising:

a pump for pumping cooling fluid from a reservoir through said inlet conduit, said intermediate conduit and said outlet conduit and back to said reservoir.

21. A measurement device in combination with a heat exchanger as claimed in claim 15, further comprising:

said three way valve includes an actuator positioning said three way valve, said three way valve includes four positions, said retrieve port communicating with said chamber port, said launch port communicating with said chamber port, said retrieve port communicating with said launch port, and, closed, said closed position prohibiting flow between any two of said ports.

22. A measurement device in combination with a heat exchanger as claimed in claim 15, wherein said three-way valve is positioned such that said retrieve port communicates with said launch port and said heat tracer sensor passes through said heat exchanger multiple times.

* * * * *

UNITED STATES PATENT AND TRADEMARK OFFICE
CERTIFICATE OF CORRECTION

PATENT NO.         : 8,863,820 B2                                    Page 1 of 1
APPLICATION NO.    : 12/778654
DATED              : October 21, 2014
INVENTOR(S)        : Laursen et al.

It is certified that error appears in the above-identified patent and that said Letters Patent is hereby corrected as shown below:

In the specification,

Col. 15, line 55, after "to" delete "with" and insert --wit-- therefor.

Col. 17, line 65, delete "200E" and insert --200F-- therefor.

In the claims,

Col. 21, line 10, delete "educating" and insert --educting-- therefor.

Signed and Sealed this
Fourteenth Day of April, 2015

Michelle K. Lee
*Director of the United States Patent and Trademark Office*